(12) United States Patent
Kamiyama et al.

(10) Patent No.: US 7,819,435 B2
(45) Date of Patent: Oct. 26, 2010

(54) REHABILITATING PIPE FOR REPAIRING EXISTING PIPE AND METHOD FOR REPAIRING EXISTING PIPE

(75) Inventors: Takao Kamiyama, Hiratsuka (JP); Koji Kaneta, Hiratsuka (JP); Kenji Fujii, Hiratsuka (JP); Makoto Ishida, Hiratsuka (JP); Yoichi Nakamura, Hiratsuka (JP)

(73) Assignee: Shonan Gosei-Jushi Seisakusho K.K. (JP)

( * ) Notice: Subject to any disclaimer, the term of this patent is extended or adjusted under 35 U.S.C. 154(b) by 630 days.

(21) Appl. No.: 11/661,664

(22) PCT Filed: Aug. 17, 2005

(86) PCT No.: PCT/JP2005/014991

§ 371 (c)(1),
(2), (4) Date: May 4, 2007

(87) PCT Pub. No.: WO2006/027939

PCT Pub. Date: Mar. 16, 2006

(65) Prior Publication Data

US 2008/0054625 A1    Mar. 6, 2008

(30) Foreign Application Priority Data

Sep. 10, 2004 (JP) .............................. 2004-263175

(51) Int. Cl.
*F16L 55/18* (2006.01)

(52) U.S. Cl. .................... 285/15; 285/412; 285/419; 138/159; 138/161; 138/98; 405/153

(58) Field of Classification Search ................... 285/15, 285/16, 17, 412, 411, 419, 373, 420; 138/159, 138/161, 162, 166, 157, 97, 98, 155, 160; 405/151, 153

See application file for complete search history.

(56) References Cited

U.S. PATENT DOCUMENTS

| 77,285 | A | * | 4/1868 | Holske | ....................... 138/161 |
|---|---|---|---|---|---|
| 400,262 | A | * | 3/1889 | Smith | ......................... 138/100 |
| 444,339 | A | * | 1/1891 | Dwelle | ....................... 285/331 |
| 558,436 | A | * | 4/1896 | Thomas | ...................... 405/153 |
| 830,345 | A | * | 9/1906 | Mattson | ..................... 52/583.1 |
| 935,376 | A | * | 9/1909 | Lennon | ...................... 405/152 |
| 984,337 | A | * | 2/1911 | Woodworth | ................. 405/153 |
| 1,225,867 | A | * | 5/1917 | Schumacher | ................ 285/332 |
| 1,329,522 | A | * | 2/1920 | Griffin | ..................... 137/15.08 |
| 1,331,987 | A | * | 2/1920 | Griffin | ........................ 138/100 |

(Continued)

*Primary Examiner*—David E Bochna
(74) *Attorney, Agent, or Firm*—Adams & Wilks

(57) ABSTRACT

A rehabilitating pipe for repairing an existing pipe has pipe units that are mutually coupled in a longitudinal direction of the existing pipe. Each of the pipe units has segments that are mutually coupled in a circumferential direction of the existing pipe. Each of the segments has an inner-surface plate and an outer-wall plate extending vertically from and around an entire perimeter of the inner-surface plate. The outer-wall plate has lateral plates extending along a longitudinal direction of the inner-surface plate and end plates connected between the respective lateral plates. Connecting members couple the segments together in the circumferential direction to assemble the pipe unit. A restraining member is attached to and encircles an outer circumference of the assembled pipe unit to restrain the pipe unit.

21 Claims, 24 Drawing Sheets

U.S. PATENT DOCUMENTS

| | | | |
|---|---|---|---|
| 1,331,988 A * | 2/1920 | Griffin | 285/16 |
| 1,898,380 A * | 2/1933 | Meier | 52/271 |
| 2,002,987 A * | 5/1935 | Schulz | 405/153 |
| 2,077,137 A * | 4/1937 | Wilkoff | 405/151 |
| 3,677,015 A * | 7/1972 | Chlumecky | 405/152 |
| 3,695,044 A * | 10/1972 | Hoshino et al. | 405/152 |
| 3,708,187 A * | 1/1973 | Campbell | 285/373 |
| 3,859,802 A * | 1/1975 | Platner et al. | 405/152 |
| 4,397,583 A * | 8/1983 | Horncy et al. | 405/150.1 |
| 7,017,613 B2 * | 3/2006 | Miura et al. | 138/98 |
| 7,165,578 B2 * | 1/2007 | Kamiyama et al. | 138/98 |
| 7,322,382 B2 * | 1/2008 | Kamiyama et al. | 138/162 |
| 7,341,280 B2 * | 3/2008 | Kamiyama et al. | 285/15 |
| 7,506,895 B2 * | 3/2009 | Kamiyama et al. | 285/15 |

* cited by examiner

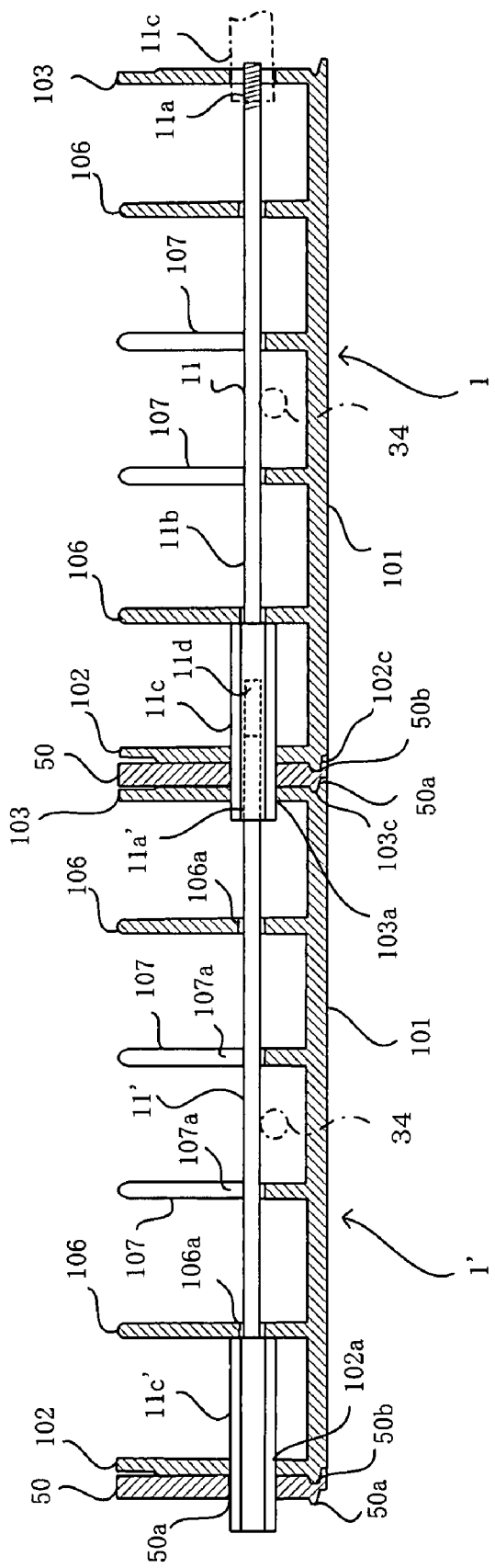

REHABILITATING PIPE FOR REPAIRING EXISTING PIPE AND METHOD FOR REPAIRING EXISTING PIPE

CROSS-REFERENCE TO RELATED APPLICATIONS

This application is a U.S. national stage application of International Application No. PCT/JP2005/014991, filed Aug. 17, 2005, claiming a priority date of Sep. 10, 2004, and published in a non-English language.

TECHNICAL FIELD

The present invention relates to a rehabilitating pipe for repairing pipeline facilities in which segments are linked with each other and assembled in the circumferential and longitudinal directions of the pipe. The segment is an integral plastic unit comprised of an inner-surface plate constituting the inner circumferential surface and lateral plates and end plates that are vertically arranged on the rim of the inner-surface plate. The present invention also relates to a method for repairing pipeline facilities that is carried out using this rehabilitating pipe.

BACKGROUND ART

In cases where sewage pipes or other pipelines that are buried underground have aged, methods for constructing a pipe lining, wherein a lining is applied to the inner circumferential surface to repair the pipeline without unearthing the pipeline, have already been proposed and are being employed in practical applications.

With the aforementioned methods for constructing a pipe lining, a pipe-lining material, which is formed, e.g., by impregnating a tube-shaped resin-adsorbent with an uncured thermosetting resin, is inserted into a pipeline via fluid pressure while being everted, and the impregnated thermosetting resin is cured by heating the pipe-lining material using an arbitrary method when the pipe-lining material is pressed against the inner circumferential wall of the pipeline by fluid pressure. A plastic pipe is thereby formed within the pipeline and the pipeline is repaired.

In another well-known method for repairing a pipeline using a rehabilitating pipe (Patent Document 1), a plastic material is used to integrally form a segment (block) comprised of an inner-surface plate constituting the inner circumferential surface and lateral plates and end plates that are vertically arranged on the rim of the inner-surface plate. Segments are linked in the circumferential direction to assemble pipe units (short pipes), which are themselves linked in the pipe length direction to make the rehabilitating pipe. This method is used for large-bore pipelines.

Patent Document 1: Japanese Laid-open Patent Application No. 2003-286742

Repairing pipeline facilities using a rehabilitating pipe that uses conventional segments has drawbacks in that only a minimal internal framework structure is provided in the circumferential direction, and deformation readily occurs due to external forces. It is proposed in Patent Document 1, for example, that a plurality of reinforcing bars be positioned in the circumferential direction to yield an internal framework structure (paragraph [0019]), but since the reinforcing bars are attached to the segments using an adhesive, or are connected and attached by binding cable to bolts for use in linking in the pipe length direction, problems have arisen in that the segments are not restrained with adequate force in the circumferential direction, and deformation occurs if major external forces act on the pipe unit and the rehabilitating pipe.

SUMMARY OF THE INVENTION

The present invention was devised in order to solve such problems, and its object is to provide a rehabilitating pipe that does not readily deform due to external forces and that imparts a high degree of strength to the structure of the repaired pipeline, and to provide a method for repairing pipeline facilities using this rehabilitating pipe.

The present invention is characterized by a rehabilitating pipe for repairing pipeline facilities in which segments are linked in a circumferential direction and in a pipe length direction, the segment being an integrally formed plastic unit comprising an inner-surface plate constituting an inner circumferential surface and lateral plates and end plates that are vertically arranged on a rim of the inner-surface plate, wherein the segments are linked in the circumferential direction to construct a pipe unit, to which a restraining member is attached to encircle an outer circumference of the pipe unit to restrain same.

The present invention is also characterized by a rehabilitating pipe for repairing pipeline facilities in which segments are linked in a circumferential direction and a linking member is used to link the segments in a pipe length direction as an assembly, the segment being an integrally formed plastic unit comprising an inner-surface plate constituting an inner circumferential surface and lateral plates and end plates that are vertically arranged on a rim of the inner-surface plate, wherein a reinforcement plate of a metal or carbon fiber material is provided to a portion along the circumferential direction of the lateral plate, and is fastened to the segment via the linking member when the segments are linked in the pipe length direction.

The present invention is also characterized by a method for repairing pipeline facilities that uses a rehabilitating pipe in which segments are linked in a circumferential direction and in a pipe length direction, the segment being an integrally formed plastic unit comprising an inner-surface plate constituting an inner circumferential surface and lateral plates and end plates that are vertically arranged on a rim of the inner-surface plate, comprising the steps of:

linking the segments in the circumferential direction to construct a pipe unit;

attaching a member to the pipe unit for encircling an outer circumference thereof; and linking, with the pipe unit restrained by the member, the pipe unit in the pipe length direction to construct the rehabilitating pipe.

The present invention is also characterized by a method for repairing pipeline facilities that uses a rehabilitating pipe in which segments are linked in a circumferential direction and a linking member is used to link the segments in a pipe length direction as an assembly, the segment being an integrally formed plastic unit comprising an inner-surface plate constituting an inner circumferential surface and lateral plates and end plates that are vertically arranged on a rim of the inner-surface plate, comprising the steps of:

providing a reinforcement plate composed of metal or carbon fiber material to a portion along the circumferential direction of the lateral plate of the segment; and linking the segments in the pipe length direction to construct the rehabilitating pipe while fastening the reinforcement plate to the segment via the linking member.

According to the present invention, a restraining member or a reinforcement plate is provided to the segments or the pipe units. This enables an internal framework structure to be obtained with a high degree of strength even in the circumferential direction perpendicular to the pipe length direction. Since external forces acting on the rehabilitating pipe can be dispersed throughout the entire framework structure, a rehabilitating pipe can be obtained that has a high degree of strength and that does not readily deform due to external forces.

BRIEF DESCRIPTION OF DRAWINGS

FIG. 21 is a perpendicular cross-sectional view of the segment that corresponds to FIG. 10, wherein the segments, to which the reinforcement plates are attached, are linked in the pipe length direction;

DESCRIPTION OF REFERENCE NUMERALS

1 Segment
10 Pipe unit
20 Manhole
21 Existing pipeline
30 Band
34 Wire
40 Rehabilitating pipe
50, 51, 52, 53 Reinforcement plate

DESCRIPTION OF THE PREFERRED EMBODIMENTS

The present invention concerns a rehabilitating pipe employing a segment that has an internal framework structure having a high degree of strength even in the circumferential direction perpendicular to the pipe length direction. The segment is capable of dispersing external forces acting in the pipe length direction and the radial direction of the pipe throughout the entire framework structure. The present invention also relates to a method that uses this rehabilitating pipe to repair sewage pipes, tunnels, irrigation canals, or other existing pipes and pipeline facilities. The present invention will be described in detail below on the basis of embodiments with reference to the accompanying drawings.

The rehabilitating pipe is described in the embodiments as being circular in cross section, taken perpendicularly with regard to the pipe length direction, but it will be apparent that the present invention may also be applied to rehabilitating pipes having rectangular or other non-circular shapes. The present invention is also applicable, when, instead of being closed into a pipe, the cross section has the shape of a horseshoe, a semicircle, a square with one side missing, or another shape that is opened on one side, which are also regarded as pipes.

Embodiment 1

Figure 1:
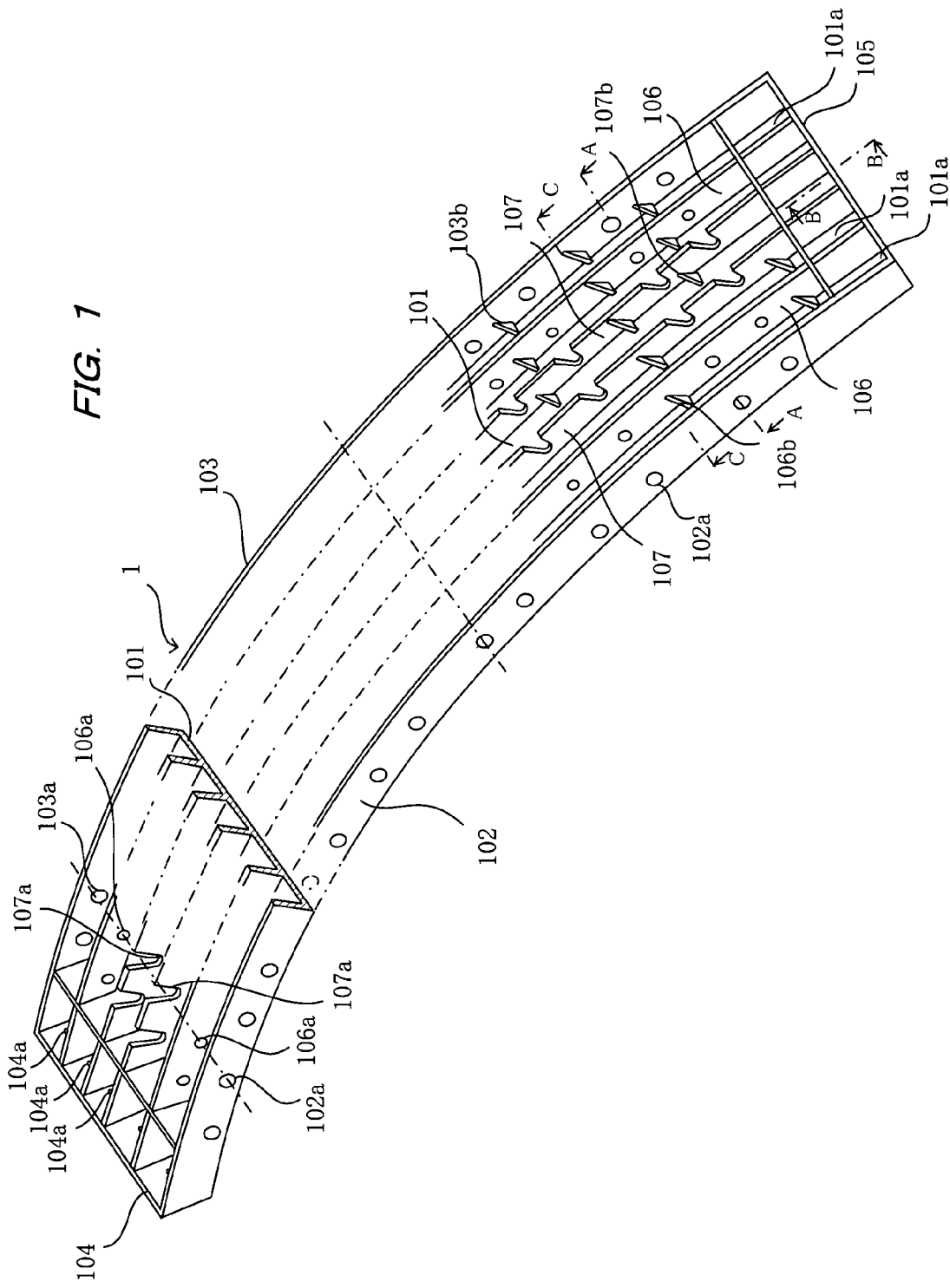
FIG. 1 is a perspective view that shows a partially abbreviated cross section of a part of a schematic configuration of a segment.
Figure 2:
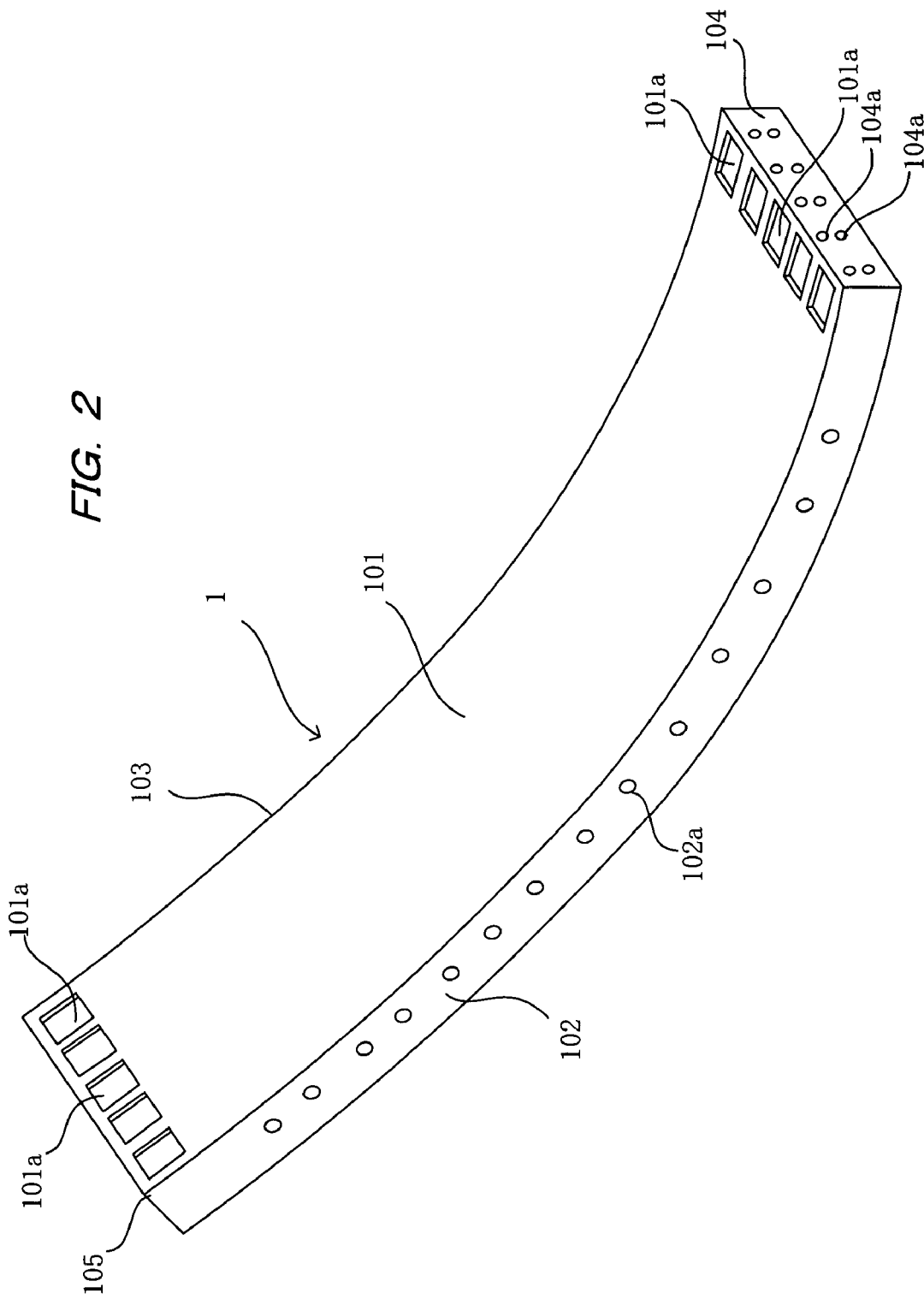
FIG. 2 is a perspective view of the segment that shows the segment of FIG. 1 flipped over so that the inner-surface plate is on top.

The rehabilitating pipe of the present invention is laid within an existing pipe by linking and assembling block-shaped segments in the circumferential and pipe length directions. A segment 1, which is a unit used to assemble the rehabilitating pipe, has an inner-surface plate 101, as shown in FIGS. 1 and 2. The inner-surface plate 101 is formed as a curved plate of a prescribed width in an arc having a prescribed angle that divides the circumference of a circle into a plurality of equal parts, e.g., five equal parts of 72 degrees each. The lower surface thereof (the upper surface in FIG. 2)

is the inner-circumferential surface of the rehabilitating pipe, the circumferential direction of the arc is the circumferential direction of the rehabilitating pipe, and the widthwise direction is the longitudinal direction of the rehabilitating pipe. A plurality of rectangular opening parts 101a are formed on both circumferential ends of the inner-surface plate 101 so that the operation for linking the segments 1 in the circumferential direction can be performed from the inside.

An outer-wall plate is vertically positioned on the rim of the inner-surface plate 101 and passes once around the inner-surface plate 101 so that it may be encircled. The outer-wall plate is constructed from two lateral plates (side plates) 102, 103 that have the same height and that are both vertically positioned on the rim along the longitudinal direction (circumferential direction) of the inner-surface plate 101; and two end plates 104, 105 that have the same height as the lateral plates 102, 103 and that are both vertically positioned on the rim along the short-side direction of the inner-surface plate 101 (the pipe length direction). A plurality (fourteen in this case) of insertion holes 102a, 103a are formed in the circumferential direction at prescribed intervals on both of the lateral plates 102, 103 so that linking members, described hereinafter, can be inserted in the pipe length direction. Insertion holes 104a, 105a are formed in a plurality of locations on the end plates 104, 105 so that bolts that link the segments 1 in the circumferential direction can be inserted (see also FIG. 4).

Reinforcement plates 106, 107, which have the same height as the lateral plates 102, 103, are vertically positioned on the upper surface of the inner-surface plate 101 on the inside of the lateral plates 102, 103 in order to reinforce the overall mechanical strength of the segment 1. A plurality of insertion holes 106a and notches 107a are formed on the reinforcement plates 106, 107 in locations that correspond to the insertion holes 102a, 103a, respectively, of the lateral plates 102, 103 so that the linking members can be inserted in the pipe length direction. Small convex plates 103b, 106b, 107b (portions of which cannot be shown in FIG. 1 and are therefore not visible) that have right-triangle shapes and project laterally are formed in a plurality of locations on both lateral surfaces of the reinforcement plates 106, 107 and the inner lateral surfaces of the lateral plates 102, 103 in order to prevent deformations thereof, resulting in a ribbed structure and increasing the strength of the segment 1.

The inner-surface plate 101, the lateral plates 102, 103 and the end plates 104, 105 that constitute the outer-wall plate, as well as the two reinforcement plates 106, 107 and the convex plates are all integrally formed from a transparent, translucent, or opaque plastic. The entire structure, which constitutes a fan-like arc, forms an integrated segment 1 that is made of plastic. Vinyl chloride, ABS, DuraStar polymer (trade mark), and the like are used as transparent plastics; PVC, polyethylene, and the like are used as translucent plastics; and PVC, polyester, ABS, polyethylene, polypropylene, and the like are used as opaque plastics.

Since the segment functions as a rehabilitating member or a repairing member, the shape thereof is not limited to an arc/fan shape as shown in FIG. 1. The segment may also be another shape, such as a bent shape obtained by rounding off a cuboid or right angle, in accordance with the shape of the cross section of the existing pipe, the size thereof, and the location on the existing pipe to be repaired.

Figure 3:
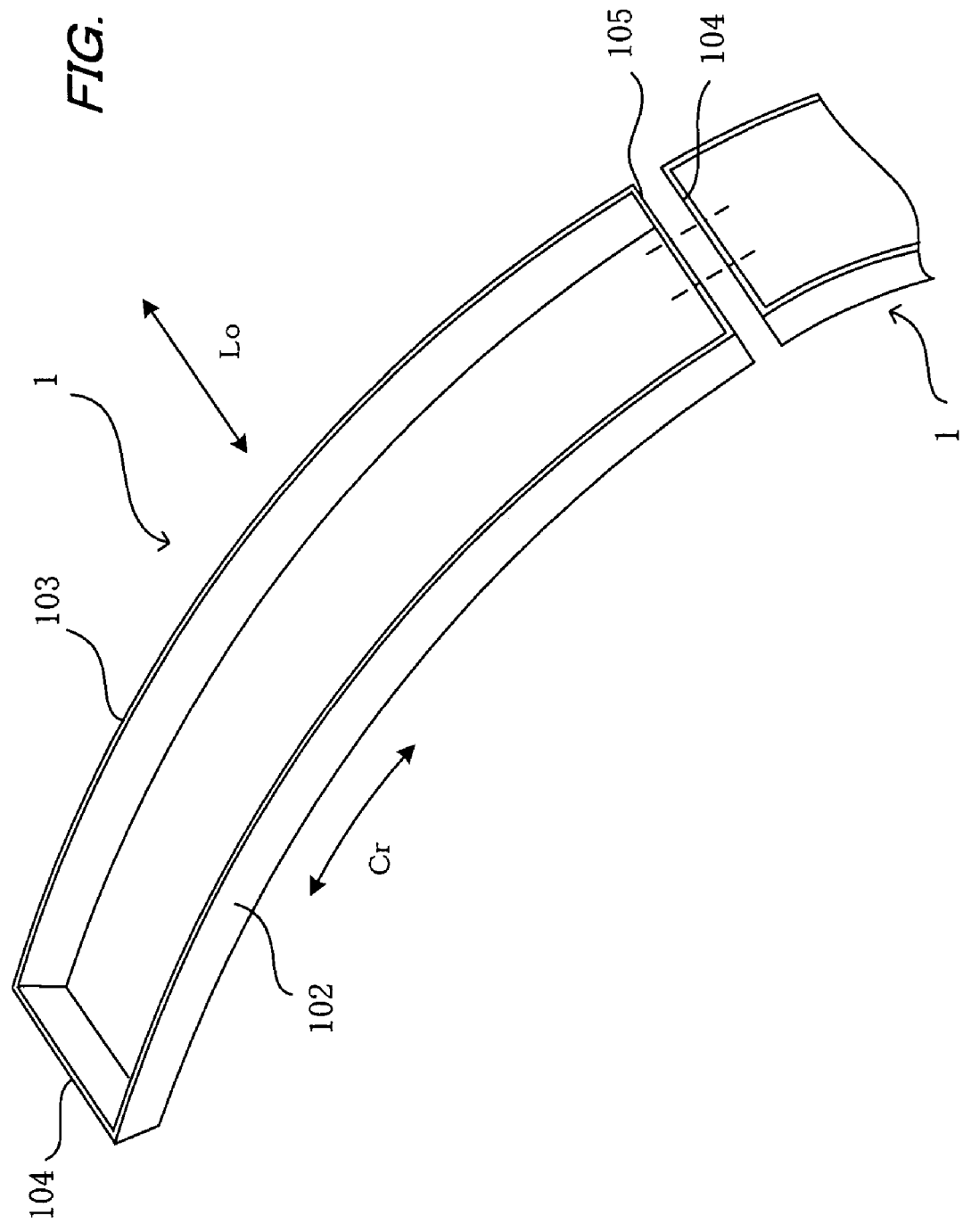
FIG. 3 is a perspective view of the segments that shows segments linked in the circumferential direction.

The thus configured segments 1 are linked sequentially as an assembly in a circumferential direction Cr, as shown in FIG. 3, so that the outer lateral surfaces of the end plates 104, 105 are brought into close contact with one another and the inner surfaces of the inner-surface plates form a uniform surface. This provides a closed pipe article 10 (referred to hereinafter as a "pipe unit") having a short, prescribed length, as shown in FIG. 5.

Figure 5:
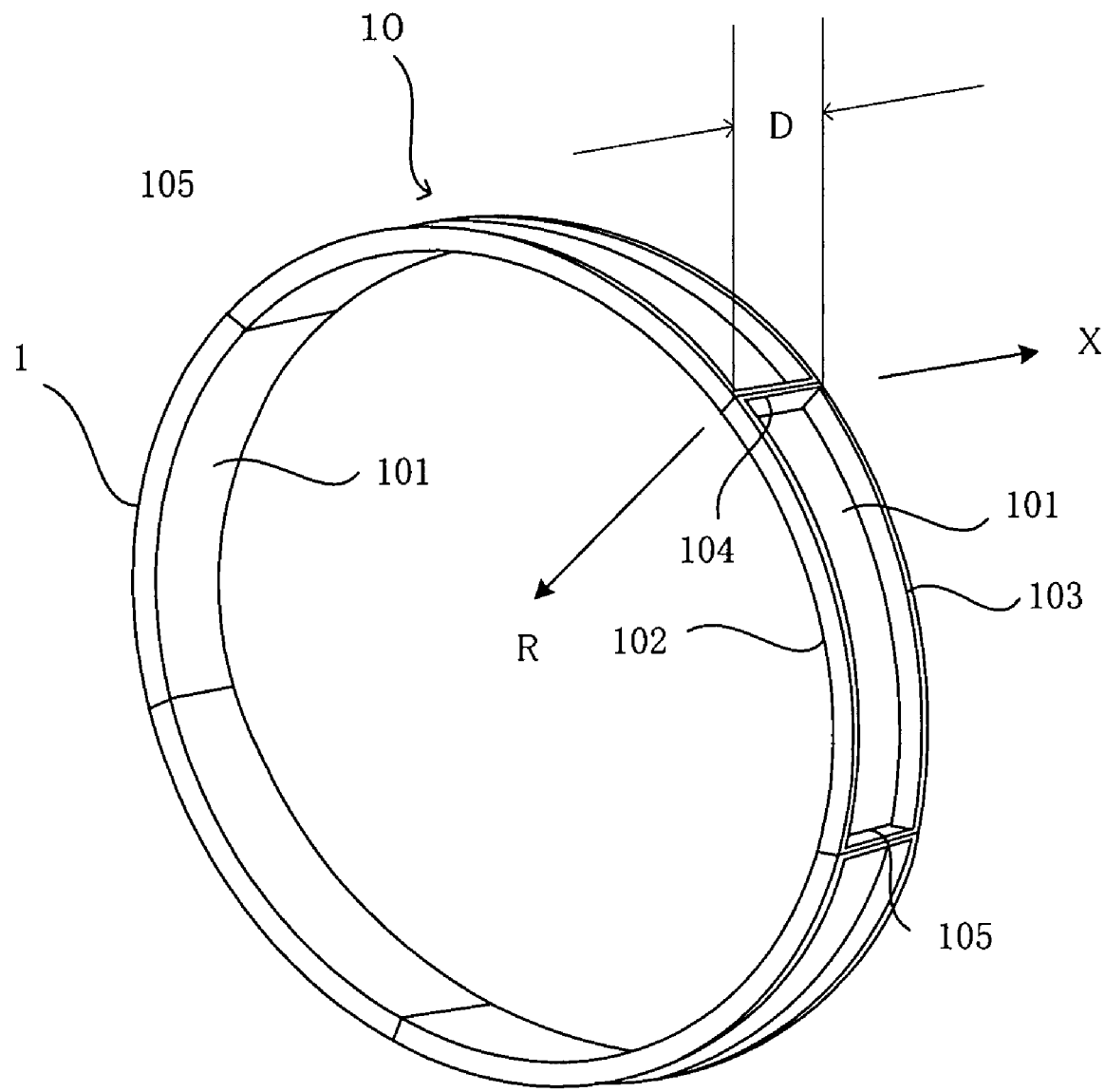
FIG. 5 is perspective view of a pipe unit wherein the segments are linked in the circumferential direction to construct the pipe unit.

The inner-surface plate 101, the lateral plates 102, 103, and the end plates 104, 105, which are the primary structural members of the segment, are shown in FIG. 3, FIG. 5 and in the drawings that correspond thereto. The reinforcement plates 106, 107, the convex plates, other reinforcing structures, the insertion holes for linking thereto, and other components have been omitted from the drawings in order to avoid confusion.

Figure 4:
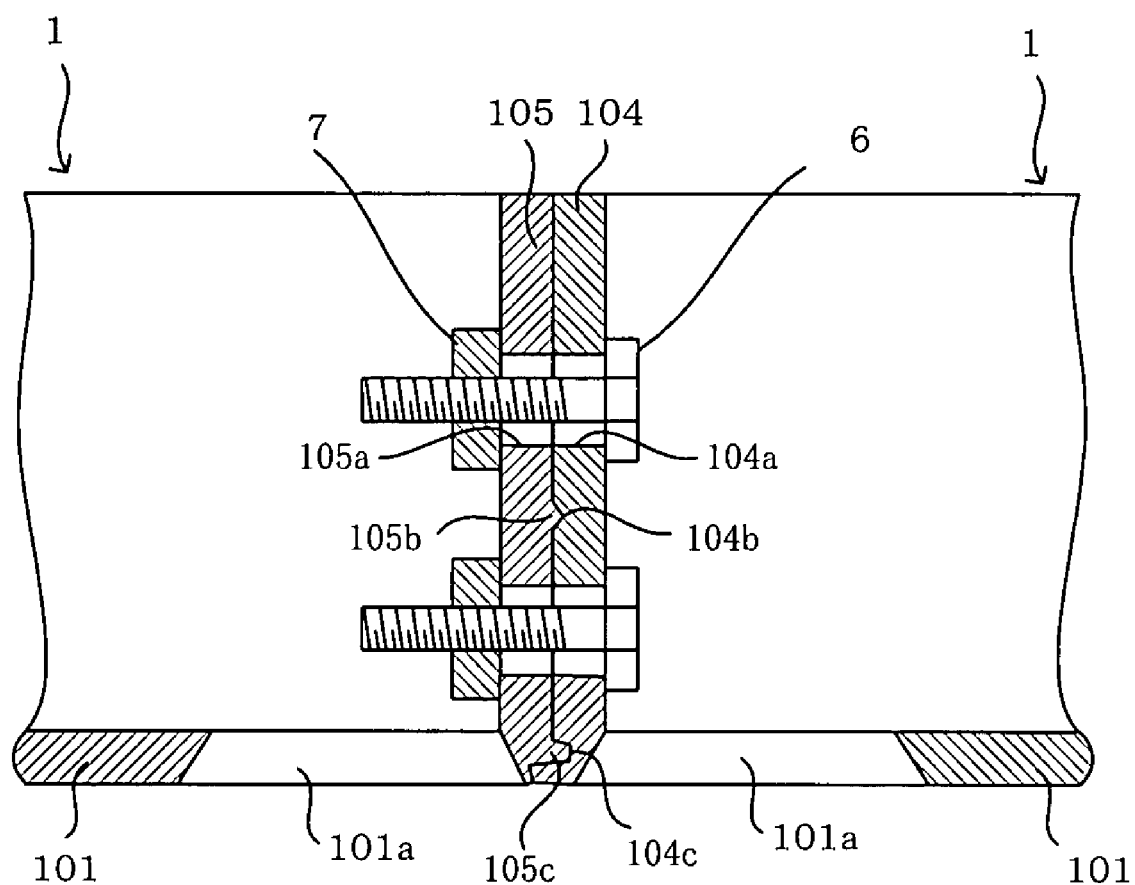
FIG. 4 is a perpendicular cross-sectional view of two segments, seen when both segments, which are linked in the circumferential direction, are cut perpendicularly along the line B-B of FIG. 1.
Figure 11:
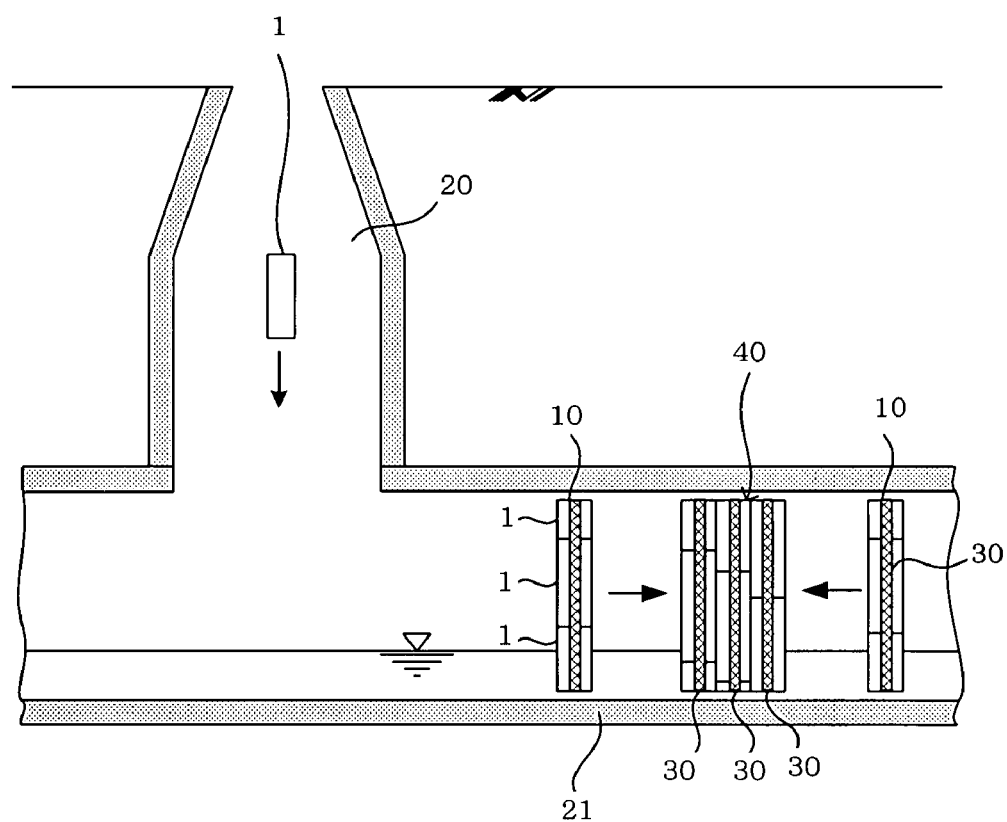
FIG. 11 is an illustrative view showing the pipe units that are linked within an existing pipeline in which a rehabilitating pipe is to be laid.

The linkage of the segments is carried out by transporting the segments 1 into an existing pipe 21 via a manhole 20, as shown in FIG. 11, and sequentially linking the segments 1 in the circumferential direction Cr, as shown in FIGS. 3 and 4. As shown in detail in FIG. 4, the linkage of the segments in the circumferential direction is carried out by aligning the segments, bringing the outer lateral surfaces of the end plates 104, 105 of the segments 1 into close contact, inserting bolts 6 into the insertion holes 104a, 105a from the opening parts 101a of the inner-surface plate 101, screwing on nuts 7, and fastening together both end plates 104, 105. As a result, the inner surfaces of the inner-surface plates 101 of the segments 1 become a single surface, while the outer lateral surfaces of the lateral plates 102 form a single surface, and the outer lateral surfaces of the lateral plates 103 all form a single surface. The cross section of the segment on the left side of FIG. 4 is a perpendicular cross section along the line B-B of FIG. 1. The cross section of the segment on the right side is also a perpendicular cross section along a corresponding line on the end plate 104 of FIG. 1.

Concave parts 104b, 104c are formed in the pipe length direction across the entire length of the end plate 104, and convex parts 105b, 105c, which fit to the concave parts, are formed in the pipe length direction across the entire length of the end plate 105, thereby simplifying the process of aligning and fastening the two segments during linkage. A sealant (not shown) is applied to the parts to be fit, whereby the water-tightness of the linking parts can be increased. Once the linkage is completed, the opening parts 101a are sealed shut with a lid (not shown) or the like. In such instances, the inner surface of the lid is continuous with the inner surface of the inner-surface plates 101, forming a uniform inner surface.

A pipe unit 10 can thus be assembled having a shape obtained by cutting a round pipe perpendicularly with respect to the longitudinal direction X thereof to obtain a circular cross-section having a prescribed width D, as shown in FIG. 5. The segments 1 correspond to the block shaped members that are obtained when the pipe unit 10 is cut along a radial direction R and divided into a plurality of (preferably equivalent) pieces in the circumferential direction. The outside diameter of the pipe unit 10 is smaller than the inside diameter of the existing pipeline to be repaired.

Figure 6:
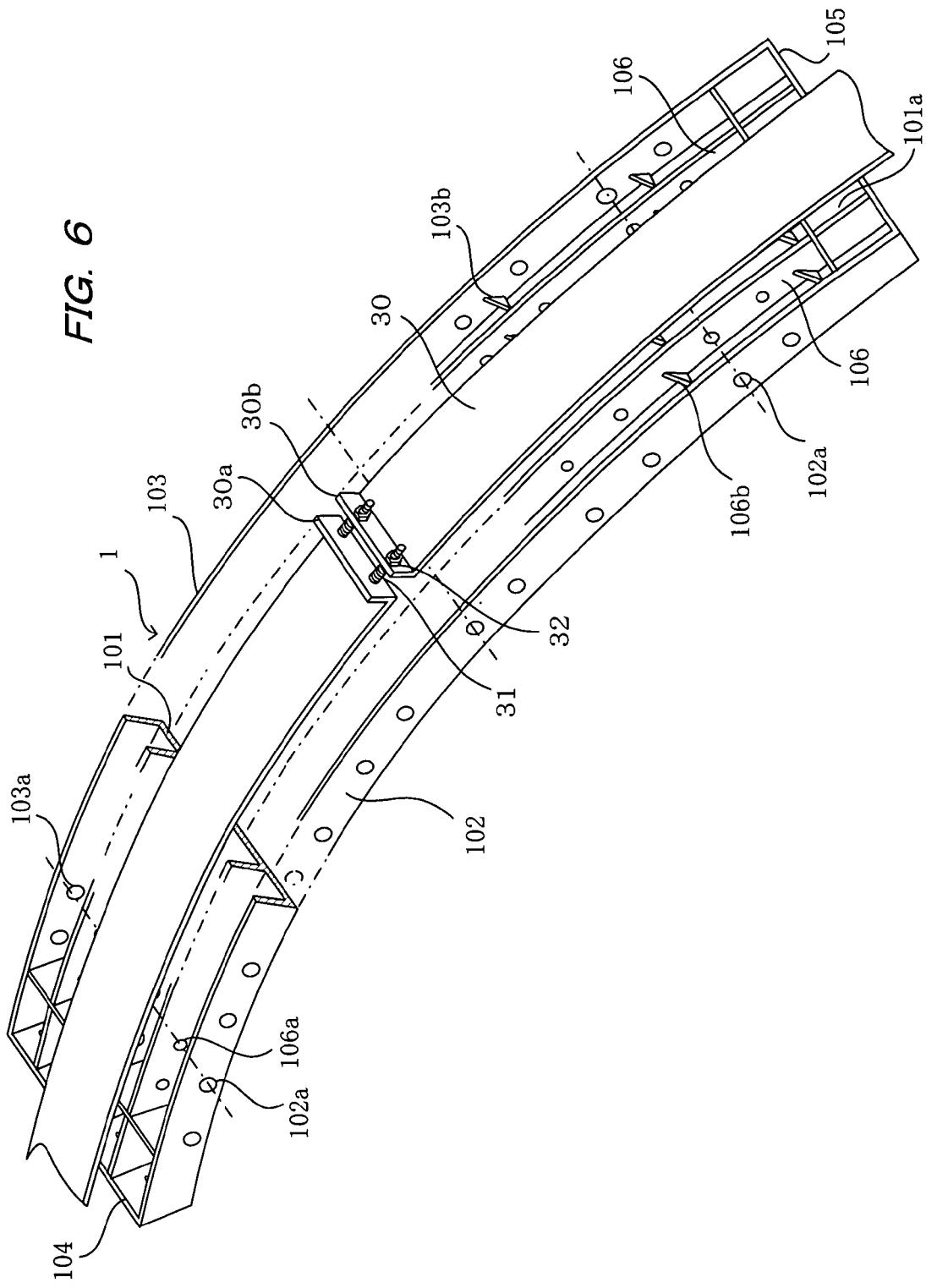
FIG. 6 is a perspective view corresponding to FIG. 1, wherein a band is used to restrain the pipe unit.
Figure 8:
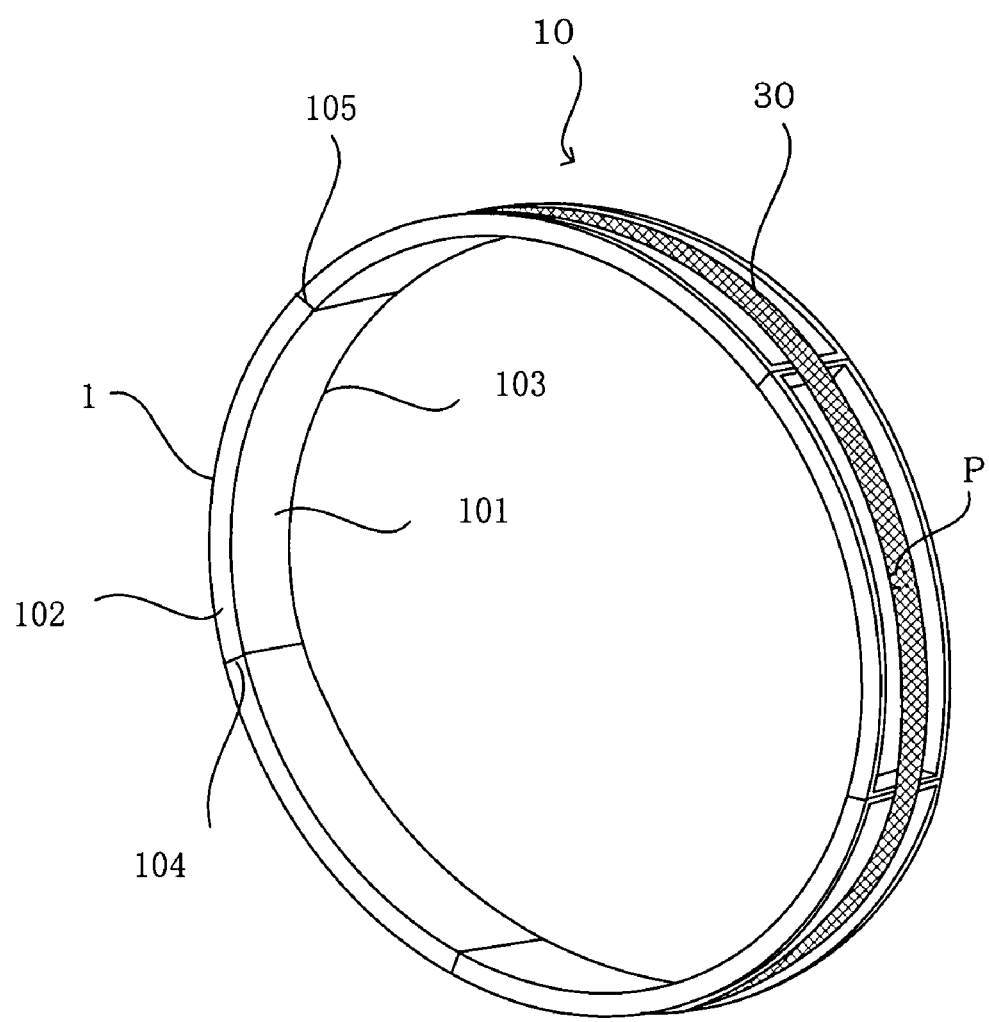
FIG. 8 is a perspective view of the pipe unit, wherein the band is attached to the pipe unit.

Other than the connecting or linking members (6, 7) in the circumferential direction, a pipe unit 10 that is assembled in this manner is made of plastic; therefore, a drawback is presented in terms of vulnerability to external forces despite the aforedescribed ribbed structure having been established. A band 30, which functions as a restraining member encircling the outer circumferential surface of the pipe unit 10, is accordingly attached to the pipe unit 10 in the present invention, as shown in FIGS. 6 and 8.

Figure 7A:
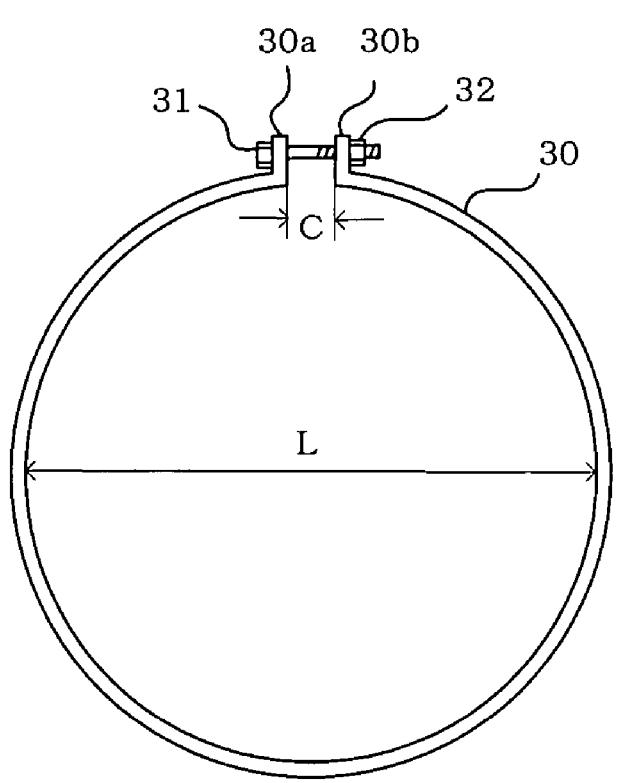
FIG. 7A is a front view of the band.
Figure 7B:
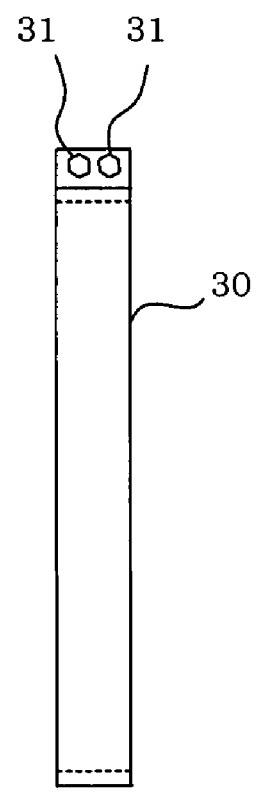
FIG. 7B is a side view of the band.

The band 30 is made of metal or carbon fiber material. The two ends 30a, 30b thereof are made to be joined by metal fasteners composed of a bolt 31 and a nut 32, as shown in FIG. 7. The full length of the band 30 is at least long enough to encircle the entirety (the entire circumference) of the outer circumferential surface of the pipe unit 10. As shown in FIG. 7A, an inside diameter L of the band 30 is set at a length that is slightly greater than the outside diameter of the pipe unit 10 when a clearance C is provided between both of the ends 30a, 30b of the band 30 and the band 30 is attached to the outer circumference of the pipe unit 10. The width of the band is set to be a width that is about one half to one fourth of the width D.

By changing the extent to which the nut 32 is screwed onto the bolt 31 in this state and adjusting the space C, a moderate fastening force is produced on the band 30 and the pipe unit 10 is restrained in a fastened state by the band 30. If the fastening force of the band 30 is excessively large, the segments may suffer localized damage, and therefore fastening with moderate tension is preferable.

A location P where the band 30 is joined using the metal fasteners, which are composed of the bolt 31 and the nut 32, is shown by an alternatingly dotted line in FIG. 8 and the drawings referenced hereinafter.

The band 30 acts as a framework member (a steel-frame member) that extends across the entire circumference of the pipe unit 10, allowing the strength of the pipe unit 10 to be markedly improved.

Figure 9:
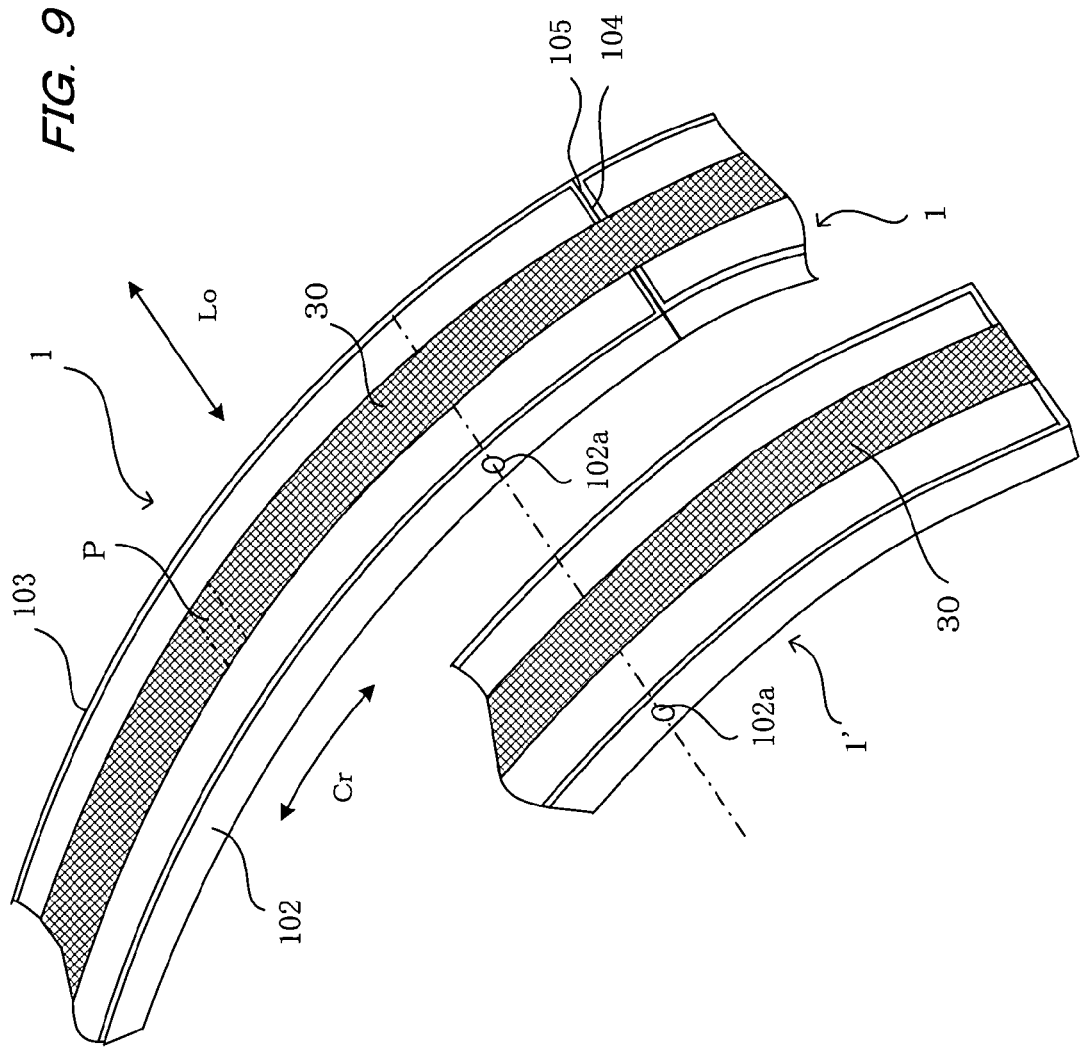
FIG. 9 is a perspective view that shows the pipe units, to which are attached the bands, when linked in the pipe length direction.
Figure 10:
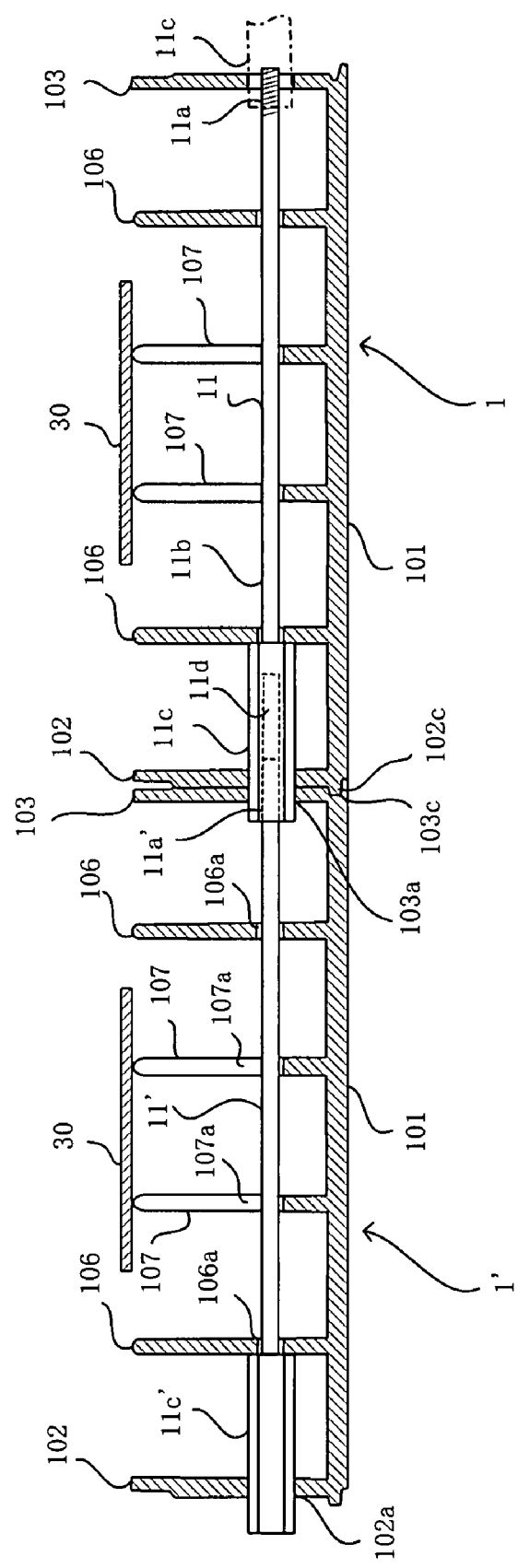
FIG. 10 is a perpendicular cross-sectional view of the segments, seen when two segments, which are linked in the pipe length direction, are cut perpendicularly along the line A-A of FIG. 1.

Pipe units 10 that are thus restrained using the band 30 are sequentially linked in a longitudinal direction Lo of the pipe, as shown in FIGS. 9 and 10. As shown in FIG. 10, linkage in the longitudinal direction is carried out using a linking member 11 that is composed of metal, wherein one end is a screw part 11a, and the other end is a nut part 11c that forms a screw hole 11d into which the screw part 11a is screwed. Both ends are integrally joined by a rod 11b.

Segments 1, 1' of two respective pipe units, which are restrained using the bands 30, are shown in FIG. 10. The cross sections of the segments 1 and 1' are equivalent to the perpendicular cross section along the line A-A in FIG. 1. The linking member 11 on the right side of FIG. 10 is already joined to the nut part 11c of another linking member (shown by the alternatingly dotted line), while being locked together with the segment 1 and fixed thereto. In order to link the other segment 1' to the segment 1 in this state, first, both of the segments 1, 1' are positioned together so that the inner surfaces of the inner-surface plates 101 are continuous, forming a uniform surface. The outer lateral surfaces of the lateral plates 102, 103 of both of the segments 1, 1' are brought tightly together, and the nut part 11c, which protrudes from the lateral plate 102 of the segment 1, is fit into the insertion hole 103a of the lateral plate 103 of the segment 1'. Next, the linking member 11' is inserted through the insertion hole 102a of the lateral plate 102 of the segment 1'. The screw part 11a' thereof is screwed into the screw hole 11d of the nut part 11c of the linking member 11, and the nut part 11c' of the linking member 11' is brought into contact with the reinforcement plate 106 of the segment 1'. Then, once screwed together, the segment 1' is fastened to the segment 1 by the nut part 11c', and therefore the linking member 11' is fixed to the segment 1', and both of the segments 1 and 1' are linked together. Each of the segments is linked using, e.g., four linking members for each segment, and therefore both of the segments 1, 1' are firmly linked together in the pipe length direction.

A convex strip 102c is formed in the circumferential direction across the entire circumference of the lateral plate 102 of the segment, and a concave strip 103c, which fits to the convex strip 102c, is formed in the circumferential direction across the entire circumference of the lateral plate 103, simplifying the process of aligning and joining the two segments during linkage in the pipe length direction, just as when linking in the circumferential direction. A sealant (not shown) is applied to the parts to be fit, whereby the water-tightness of the linking parts can be increased.

When a segment 1 is the first segment in the pipe length direction, a linking member such as the one shown in FIG. 10 cannot be used. Any desired means is therefore employed so that a fixing member having a structure identical to the nut part 11c and capable of being fixed to the segment 1 is used as a linking member.

Figure 12:
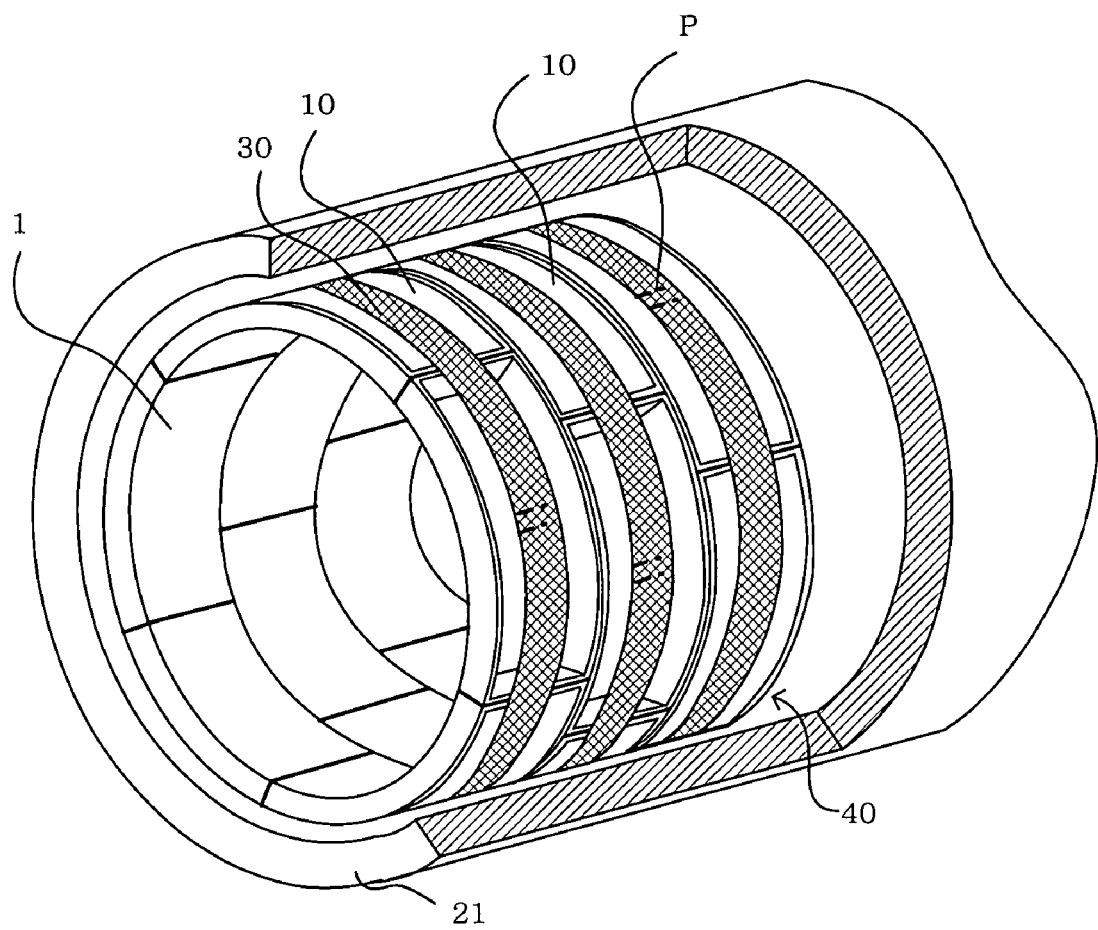
FIG. 12 is a perspective view wherein the pipe units are linked within the existing pipeline and the rehabilitating pipe has been laid.
Figure 13:
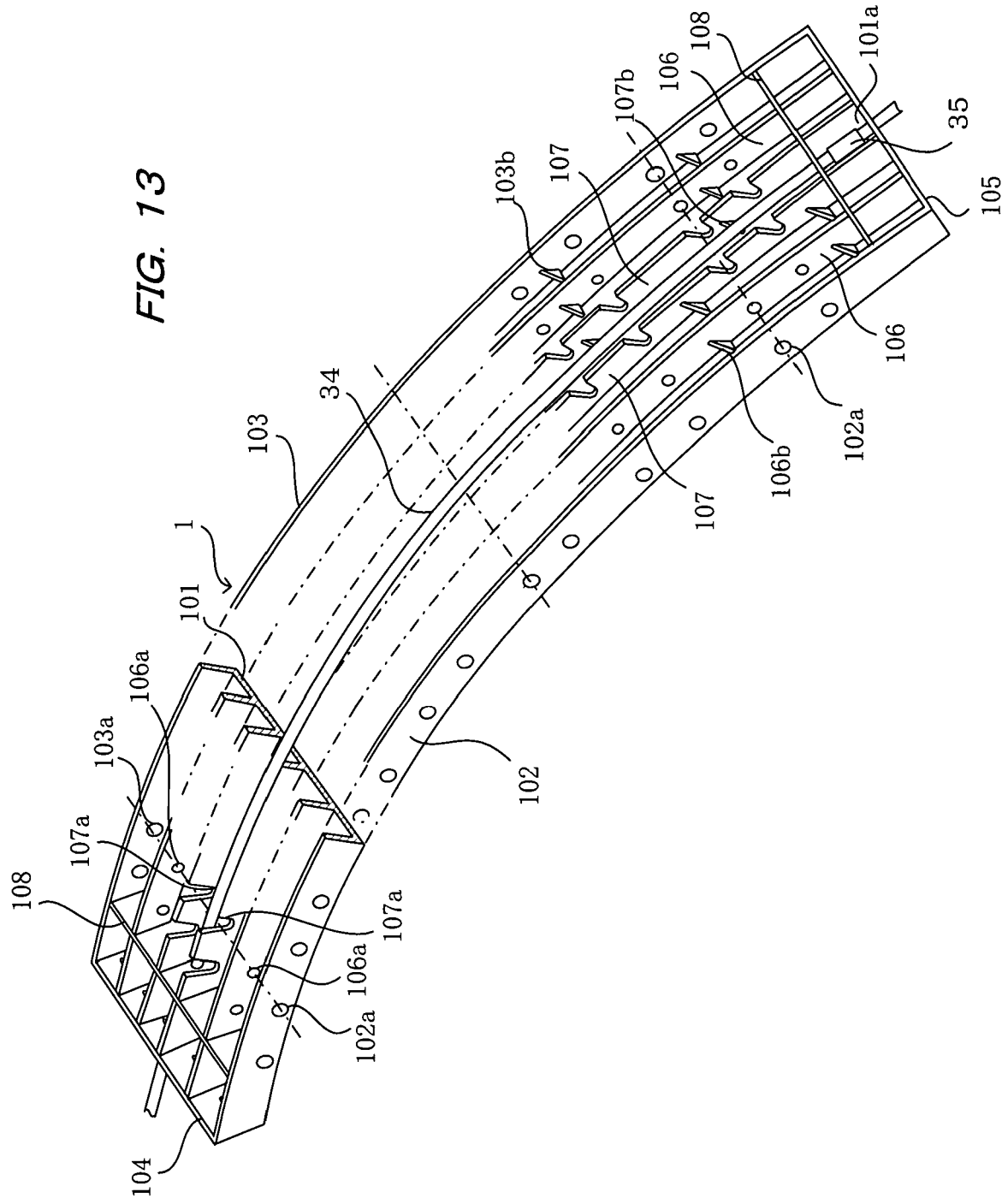
FIG. 13 is a perspective view corresponding to FIG. 1, wherein the pipe unit is restrained using a wire.

Pipe units 10 are sequentially linked as above in the pipe length direction within the existing pipe 21, as shown in FIG. 11, thereby allowing a rehabilitating pipe 40 to be laid within the existing pipe 21. This state is shown in a schematic perspective view in FIG. 12. The segments 1 of the pipe units 10 are linked in the pipe length direction with the positions of the end plates shifted (offset), but may also be linked with the end plates being in alignment. It will also be apparent that the number of inserted linking members 11 for each segment is not limited to four.

Once the laying of the pipe is complete, the space between the existing pipe 21 and the rehabilitating pipe 40 is filled with a grouting material, which hardens to yield an integrated, composite existing pipe 4. The bands 30 and the linking members 11 will join to the grouting material when the grouting material is filled in, allowing a strong reinforcement effect to be obtained. In such instances, the bands 30 function as lateral reinforcements and the linking members 11 function as longitudinal reinforcements. This allows an internal framework structure to be established in the circumferential direction and in the pipe length direction. External forces that act in the radial direction of the pipe and in the pipe length direction can thus be dispersed throughout the entire internal framework structure, allowing a structure (a composite pipe) having extremely high strength to be obtained.

Embodiment 2

Another embodiment is shown in FIGS. 13 through 18. The same reference notation will be applied to portions of Embodiment 2 that are the same as in Embodiment 1, and detailed descriptions thereof will be omitted.

Figure 15:
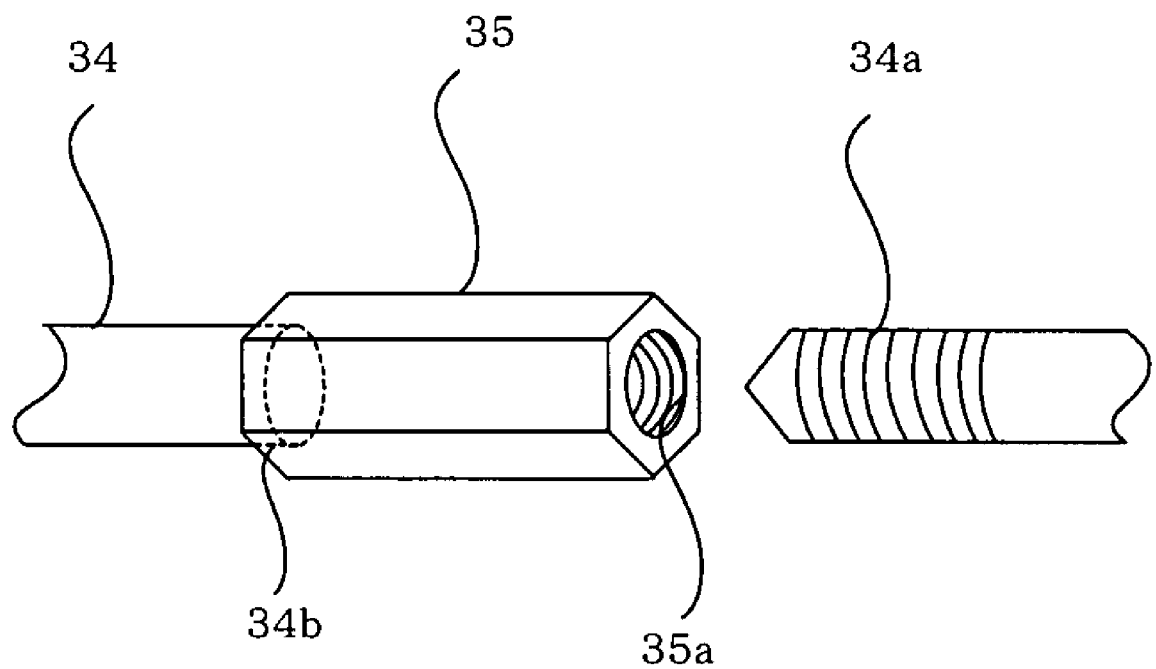
FIG. 15 is a perspective view of the wire, showing both ends of the wire joined.
Figure 17:
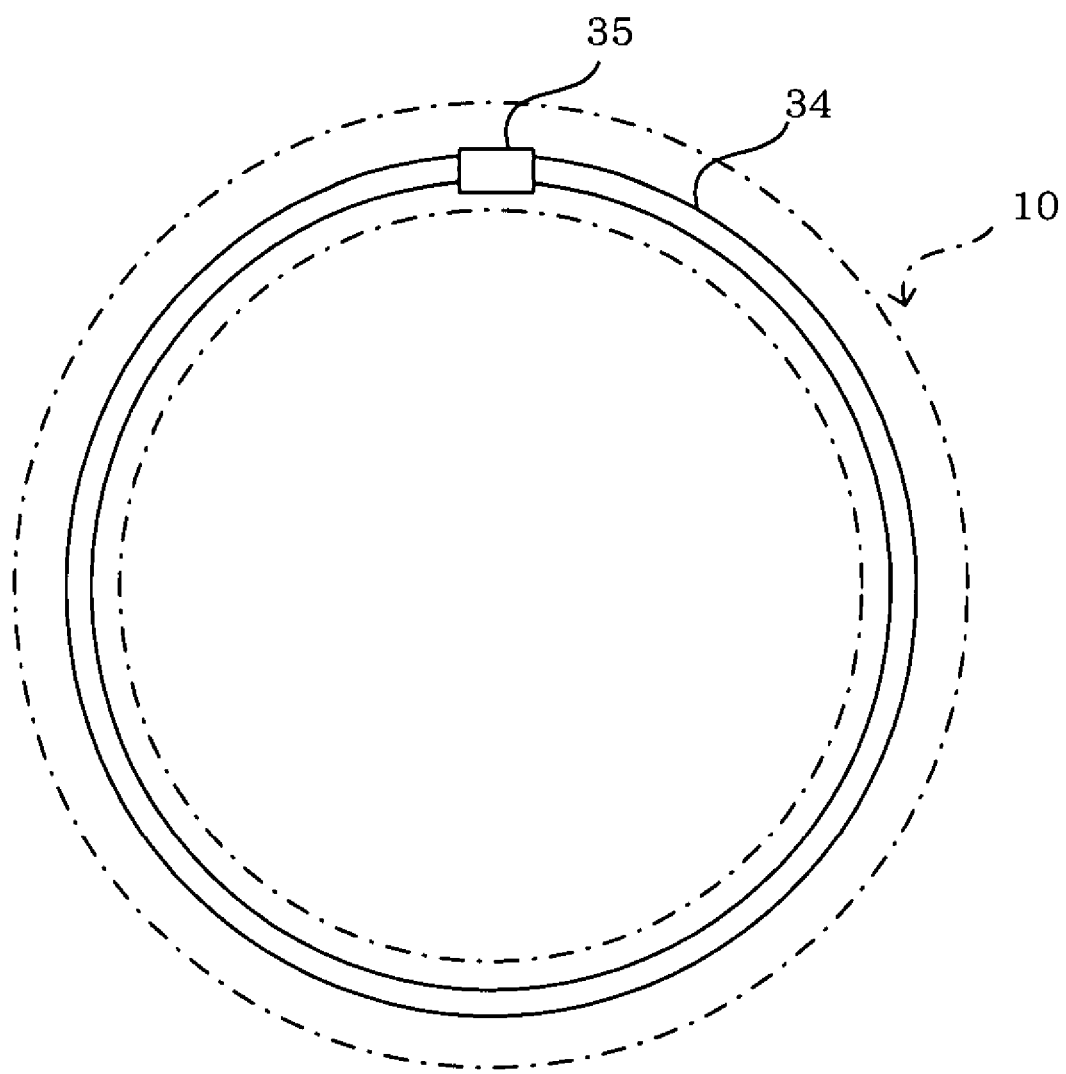
FIG. 17 is an illustrative view showing the entire shape of the wire.

A wire 34 of metal or carbon fiber material is used in Embodiment 2 instead of the band 30 of Embodiment 1. The wire 34 runs once around the inside of the pipe unit 10 in a substantially circumferential direction, as shown in FIG. 17, and is long enough to encircle the inside of the pipe unit and restrain the pipe unit. One end 34a of the wire 34 is a male screw, as shown in FIG. 15. A nut 35, which is provided with a female screw on an inner surface 35a, is rotatably attached to the other end 34b. The end 34a of this wire 34 is screwed into the inner surface 35a of the nut 35. The extent of the screwing changes if the nut 35 is rotated, allowing the circumferential length of the wire 34 to be adjusted.

Figure 14:
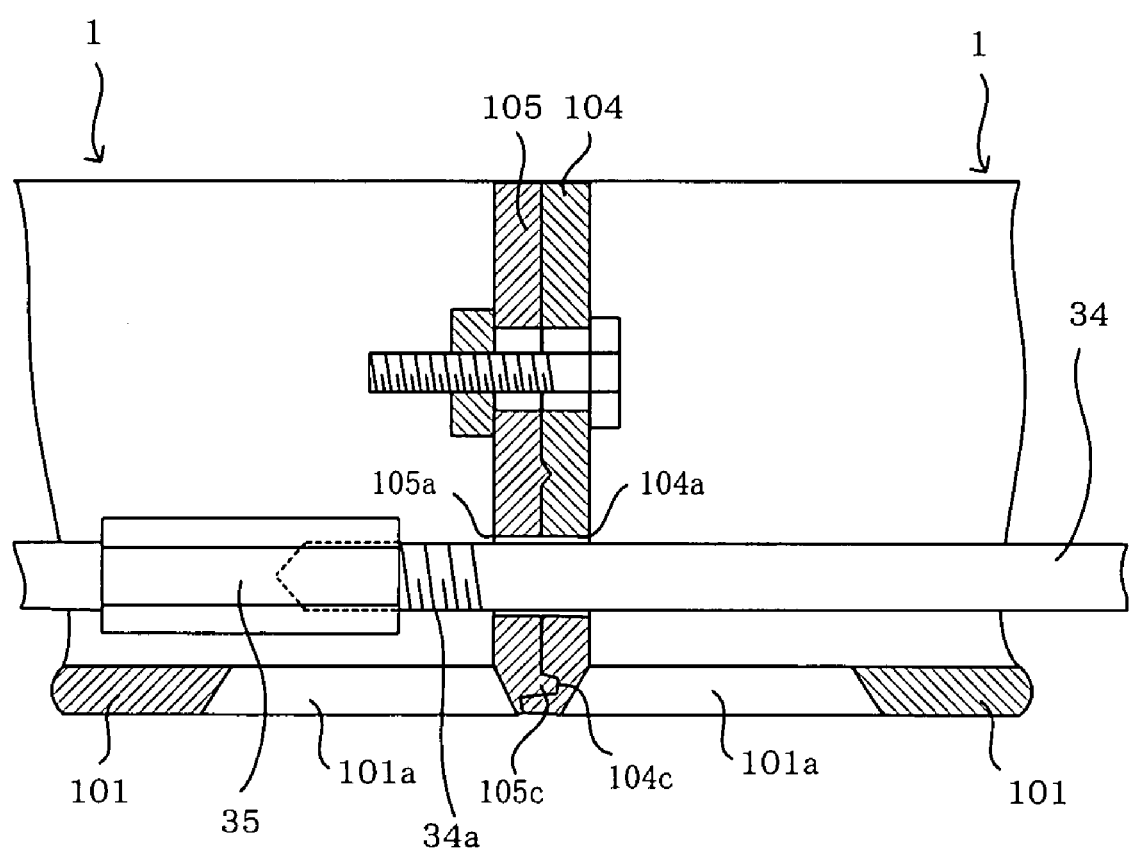
FIG. 14 is a perpendicular cross-sectional view of the segments that corresponds to FIG. 4, showing both ends of the wire joined.
Figure 16:
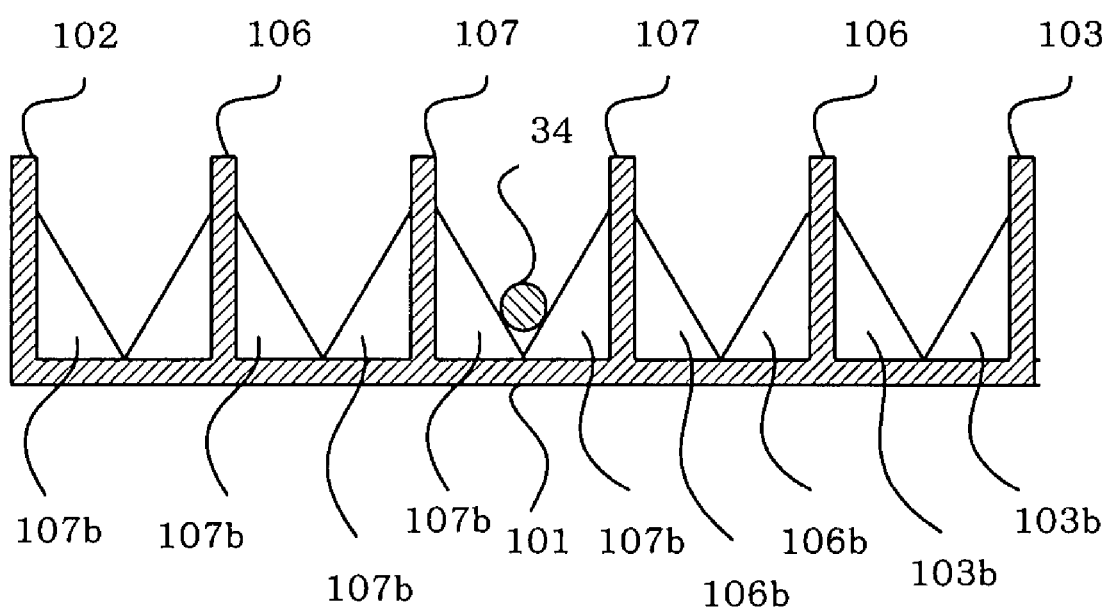
FIG. 16 is a perpendicular cross-sectional view of the segment along the line C-C of FIG. 1, wherein the pipe unit is restrained by the wire.

The wire 34 is inserted into the insertion holes 104a, 105a of the end plates 104, 105 when the segments 1 are sequentially linked in the circumferential direction using the method described in Embodiment 1. As shown in FIG. 14, when the segments are linked together to form the pipe unit 10, the end 34a of the wire 34 and the nut 35 are held in position so as to come closer to the opening parts 101a that are formed on the inner-surface plate 101, and the end 34a of the wire 34 is screwed into the nut 35, joining together both ends of the wire. The extent to which the wire 34 is tightened is changed by turning the nut 35. A moderate fastening force is produced on the segments 1, and therefore on the entire pipe unit 10 via the wire 34. In this case, the wire 34 is positioned so as to lie on the convex plates 107b that are provided to both sides of the reinforcement plate 107, as shown in FIG. 16. The pipe unit 10 is thus restrained in a fastened state by the wire 34. Holes through which the wire 34 passes are therefore also provided to an inner-wall plate 108 (FIG. 13) that is positioned on the inner side of both of the end plates 104, 105.

Since an internal framework structure that extends across the entire circumference of the pipe unit 10 is obtained via the wire 34, the strength of the pipe unit can be increased. It is also possible for the wire 34 to not be laid when the segments are sequentially linked, but to be inserted through the opening parts 101a and inserted into the insertion holes of the end plates after linkage of the pipe unit 10. Additionally, not only one wire 34, but a plurality of wires having the same configuration may be put in place. After the wire is positioned, the opening parts 101a are closed off using a cover (not shown) as in Embodiment 1.

Figure 18:
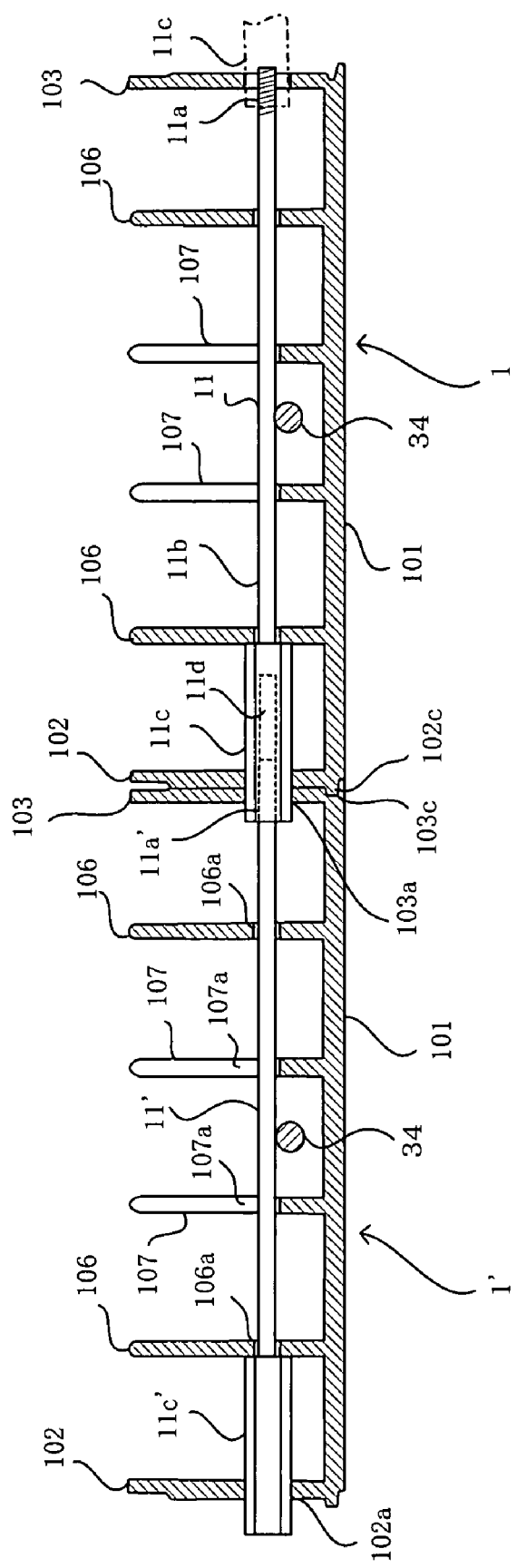
FIG. 18 is a perpendicular cross-sectional view of the segment that corresponds to FIG. 10, wherein the segments, to which the wires are attached, are linked in the pipe length direction.

When the pipe units 10 are linked together in the pipe length direction using the linking members, the linking members 11, 11' press the previously positioned wire 34 downwards, as shown in FIG. 18, increasing the tension of the wire and also the restraining force. The wire 34 functions as a lateral reinforcement, and the linking members 11, 11' function as longitudinal reinforcements. Therefore, an internal framework structure is established in the circumferential direction and in the pipe length direction, as in Embodiment 1. External forces acting in the radial and longitudinal directions of the pipe can thus be dispersed throughout the entire framework structure. The resulting framework structure will have more reliable lateral and longitudinal reinforcement than in Embodiment 1 due to the contact under pressure of the wire and the linking members. The positional displacement of the wire and the linking members will decrease and the structure will be more solid if the wire and the linking members are joined together by binding wire at the locations that are pressed together.

Once the laying of the rehabilitating pipe has been completed, the wires and linking members will be joined to the grouting material that is filled into the space between the existing pipe and the rehabilitating pipe. This makes it possible to dramatically increase the strength of the composite pipe, as in Embodiment 1.

Embodiment 3

A further embodiment of the present invention, Embodiment 3, is shown in FIGS. 19 through 24. The same reference notation will be applied to portions of Embodiment 3 that are the same as in Embodiments 1 and 2, and detailed descriptions thereof will be omitted.

Figure 19:
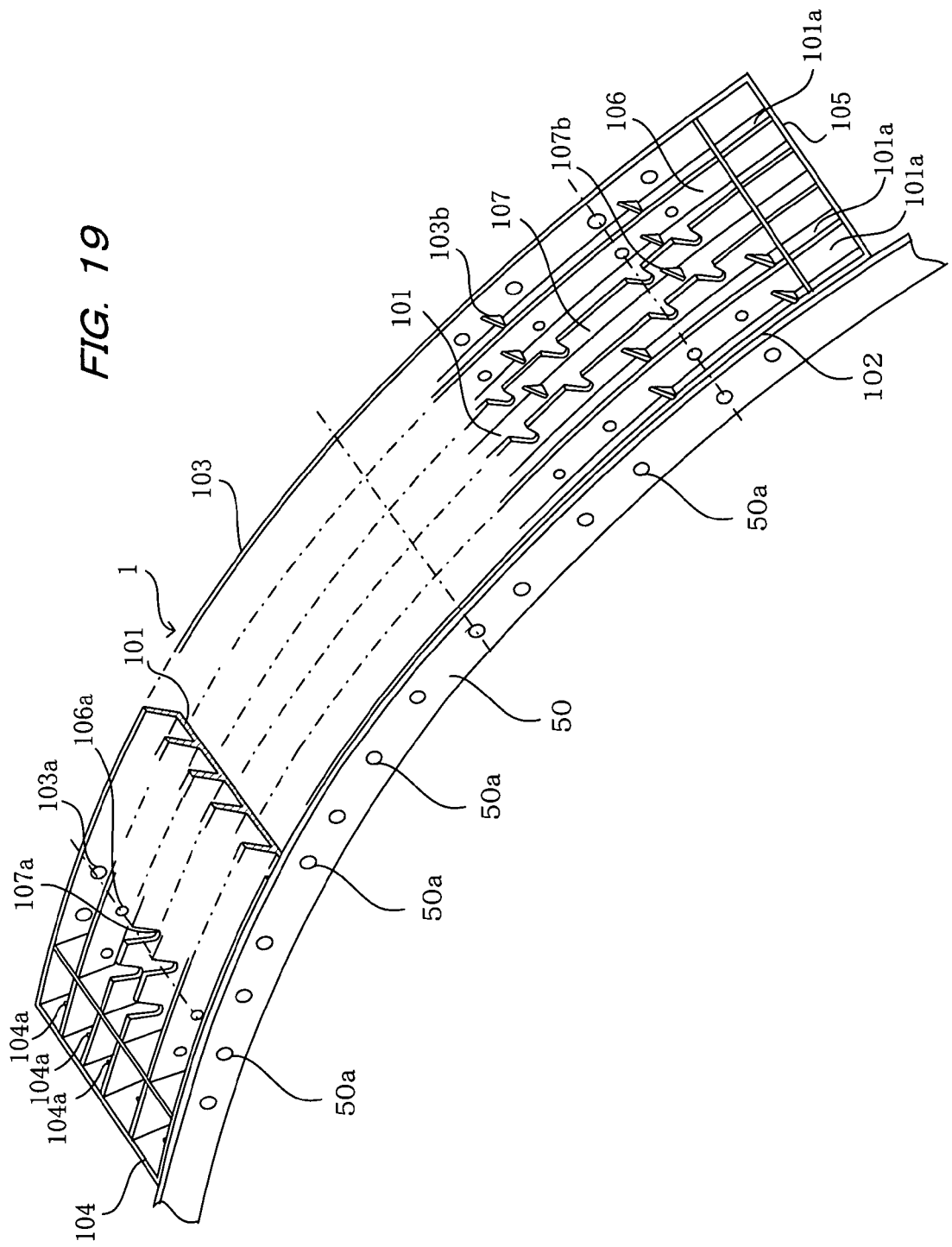
FIG. 19 is a perspective view that corresponds to FIG. 1, wherein a reinforcement plate is attached to the segment.
Figure 20A:
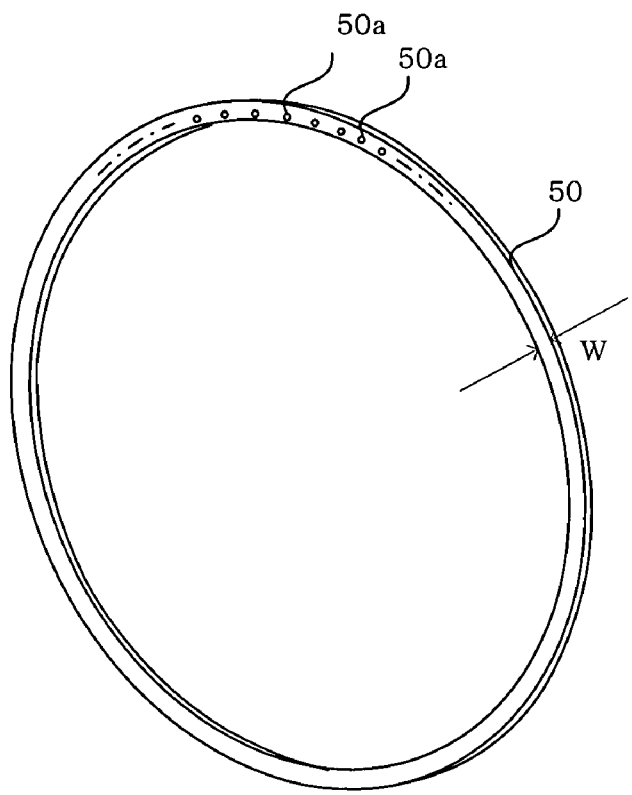
FIG. 20A is a perspective view of the reinforcement plate.
Figure 20B:
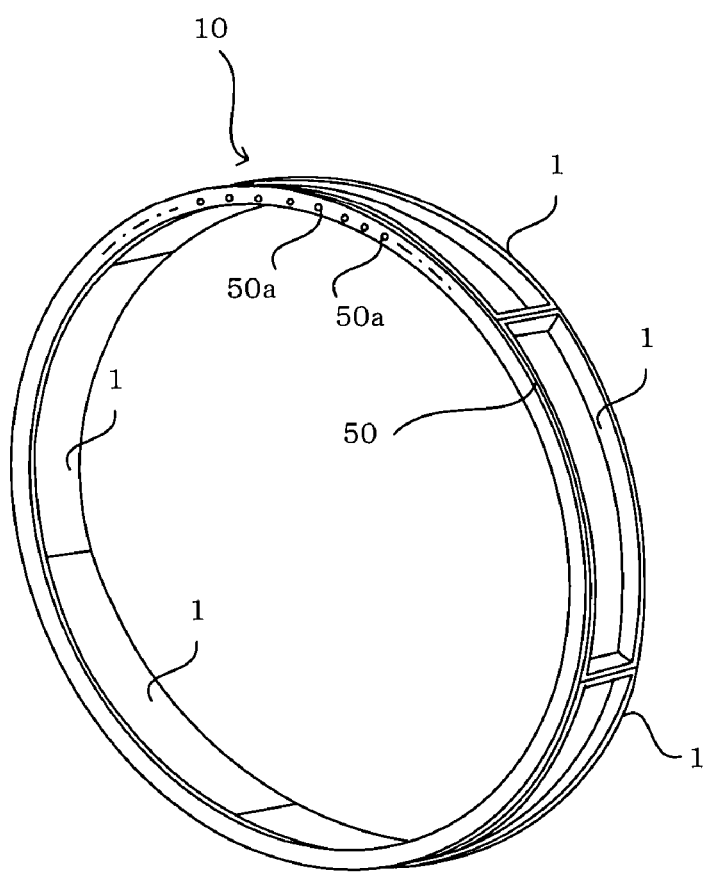
FIG. 20B is a perspective view wherein the reinforcement plate is attached to the pipe unit.

A reinforcement plate 50 made of metal or carbon fiber is attached to the lateral plate 102 of the segment 1 in Embodiment 3, as shown in FIG. 19. As shown in FIG. 20A, the reinforcement plate 50 is ring-shaped and has a width W that is substantially the same as the width (height, in FIG. 19) of the lateral plate 102. The complete shape of the reinforcement plate 50 is the same as that of the cross section of the pipe unit 10. On being attached to the pipe unit 10 as shown in FIG. 20B, the reinforcement plate 50 contacts the lateral plates of the segments 1 of the pipe unit 10 so as to share the same surface, and covers the entire lateral surface of the pipe unit 10.

A plurality of insertion holes 50a are formed across the entire circumference of the reinforcement plate 50. As shown in FIG. 20B, the insertion holes 50a are aligned so as to match the locations of the insertion holes 102a (103a), which are provided to the lateral plates 102 (103) of the segments 1, when the reinforcement plate 50 is attached to the pipe unit 10.

When the segments are linked in the circumferential direction to form the pipe unit according to this configuration, the reinforcement plate 50 is brought into close contact with the lateral plates 102 of the pipe unit, and the segments 1' are linked in the pipe length direction using the linking members 11', as shown in FIG. 21. The screw part 11a' of the linking member 11' is screwed into the screw hole 11d of the nut part 11c of the other linking member 11, whereby the reinforcement plate 50 is sandwiched between the lateral plates 103 of the segments 1' and the lateral plates 102 of the segments 1 and fastened to both segments. The reinforcement plate 50 is thereby linked with the segments 1, 1' and the linking members 11. The reinforcement plate 50 functions as a lateral reinforcement in this instance, and the linking members 11, 11' function as longitudinal reinforcements. Therefore, an internal framework structure is established in the circumferential and longitudinal directions of the pipe, resulting in an internal framework structure having a high degree of strength, as in Embodiment 2. Once the laying of the rehabilitating pipe has been completed, the reinforcement plates and linking members will be joined to the grouting material that is filled into the space between the existing pipe and the rehabilitating pipe, whereby the strength of the composite pipe will dramatically increase, as in Embodiments 1 and 2.

A convex strip 102c and a concave strip 103c are formed on the lower part of the lateral plates of the segments, as described in Embodiment 1. A convex strip 50a, which fits to the concave strip 103c, and a concave strip 50b, which fits to the convex strip 102c, are therefore formed on the reinforcement plate 50, as shown in FIG. 21.

The wire described in Embodiment 2 may also be provided in addition to the reinforcement plate 50. The wire is shown by the alternatingly dotted line 34 in FIG. 21. Strength in the circumferential direction can be further improved in this case.

Figure 22A:
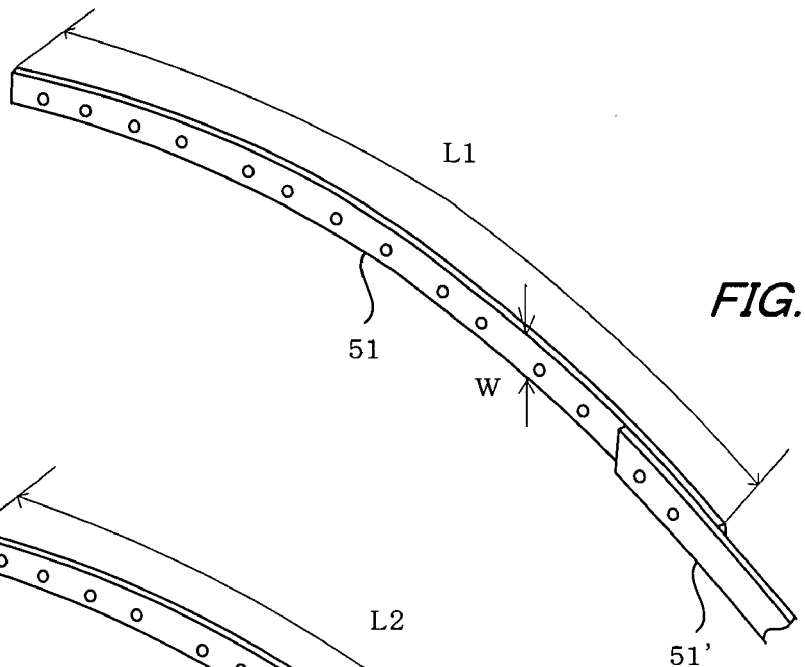
FIG. 22A is a perspective view that shows another embodiment of a reinforcement plate.
Figure 22B:
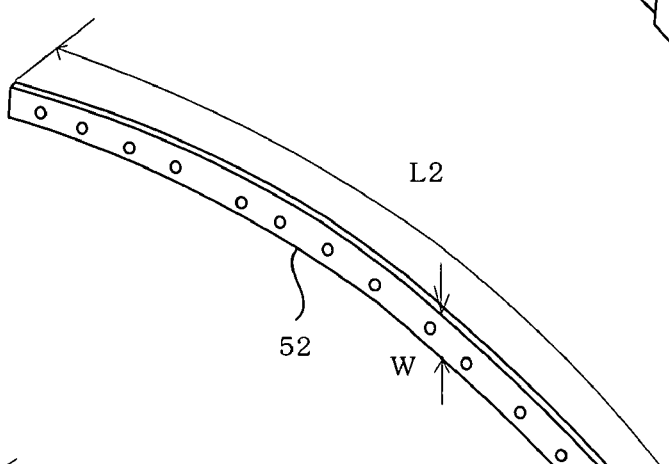
FIG. 22B is a perspective view that shows another embodiment of a reinforcement plate.
Figure 22C:
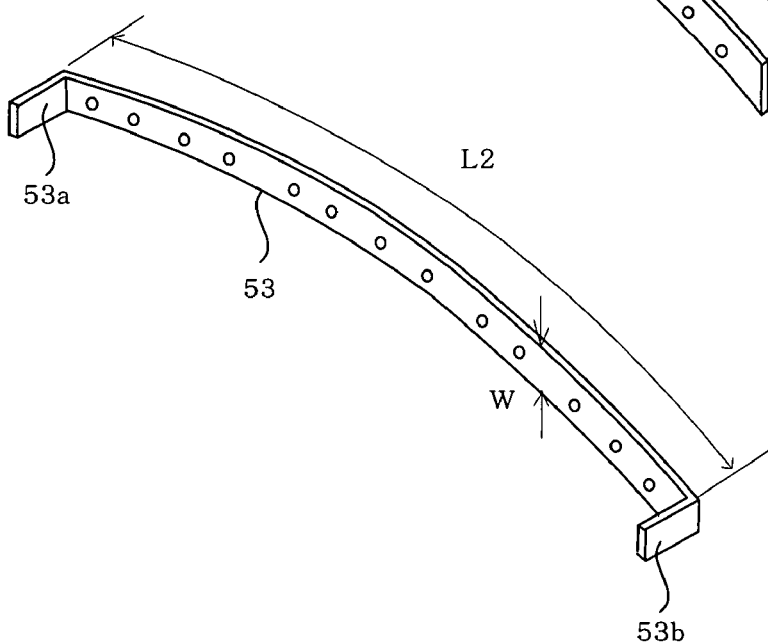
FIG. 22C is a perspective view that shows another embodiment of a reinforcement plate.

Instead of a ring shape, the reinforcement plate 50 may also be a reinforcement plate 51 that has a circumferential length L1 and a height W, which are substantially the same as the circumferential length and height of the lateral plates, as shown in FIG. 22A. In such instances, the reinforcement plate 51 can be provided to some or all of the segments that constitute the pipe unit. In this case, the reinforcement plate 51 and the reinforcement plate 51' may also be provided in a partially overlapping manner, as shown in FIG. 22A.

Figure 23:
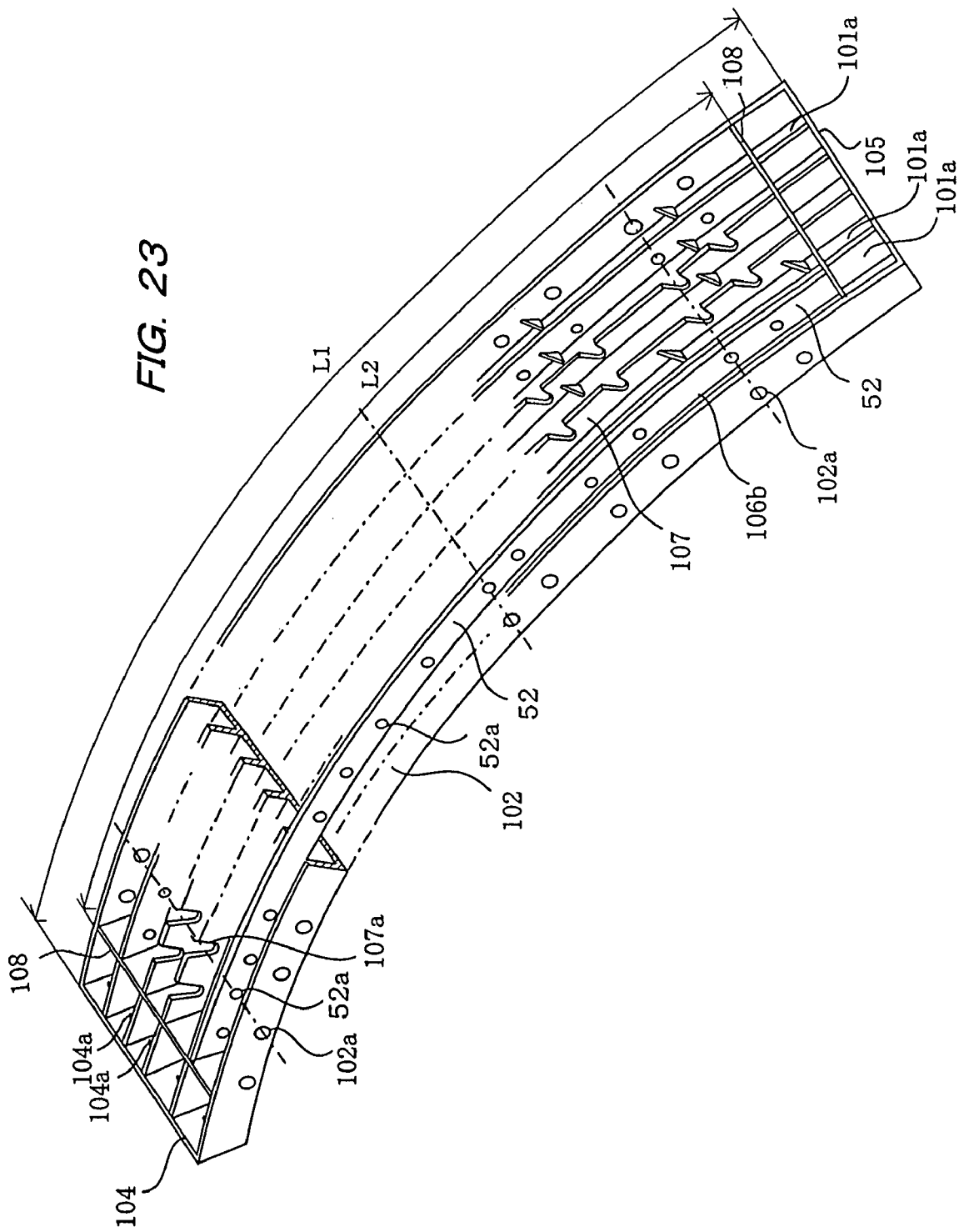
FIG. 23 is a perspective view that corresponds to FIG. 1, wherein the reinforcement plate is attached within the segment.
Figure 24:
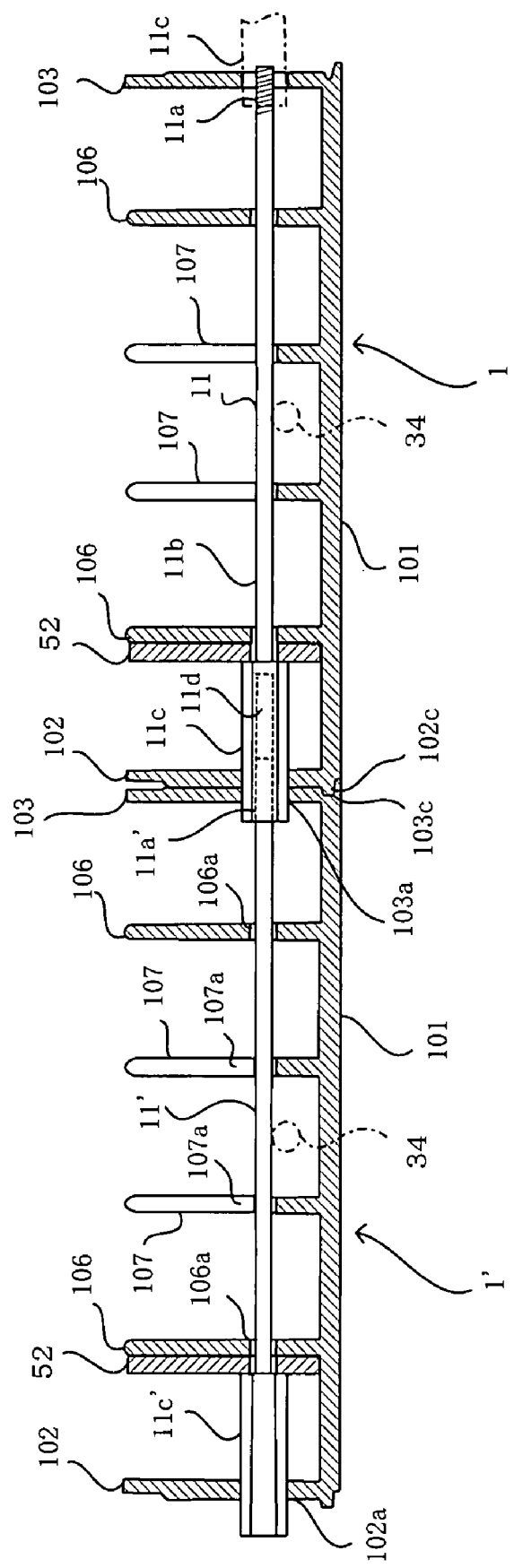
FIG. 24 is a perpendicular cross-sectional view of the segments that corresponds to FIG. 10, wherein the reinforcement plates are attached within the segments and the segments are linked in the pipe length direction.

Instead of being provided to the outside of the segment, the metal or carbon fiber reinforcement plate may also be provided to the inside of the segment, as shown in FIG. 23. For example, a reinforcement plate 52 (FIG. 22B) of circumferential length L2 between the inner-wall plates 108 on the inside of the segment may be provided adjoining the reinforcement plate 106. In this instance as well, the reinforcement plate 52 is sandwiched between the nut part 11c of the linking member and the reinforcement plate 106 and is fastened to the segments as shown in FIG. 24 when the segments are linked together in the pipe length direction using the linking members, resulting in the same effect as obtained with the reinforcement plates 50, 51. An internally-provided reinforcement plate can also be a reinforcement plate 53 that is made of metal or carbon fiber and has two bent end parts 53a, 53b. In this case, the two end parts 53a, 53b contact the end plate 108, and the position of the reinforcement plate 53 is therefore stabilized.

The invention claimed is:

1. A rehabilitating pipe for rehabilitating an existing pipe, the rehabilitating pipe comprising: a plurality of pipe units that are mutually coupled in a longitudinal direction of the existing pipe to assemble the rehabilitating pipe, each of the pipe units comprising a plurality of segments that are mutually coupled in a circumferential direction of the existing pipe to form the pipe unit, each of the segments having an inner-surface plate and an outer-wall plate extending vertically from and around an entire perimeter of the inner-surface plate, the outer-wall plate having a plurality of lateral plates extending along a longitudinal direction of the inner-surface plate and a plurality of end plates connected between the respective lateral plates; a plurality of connecting members that couple the segments together in the circumferential direction to assemble the pipe unit; and a restraining member that is attached to and encircles an outer circumference of the assembled pipe unit to restrain the pipe unit.

2. A rehabilitating pipe according to claim 1; wherein the restraining member comprises a band that encircles the entire outer circumference of the pipe unit, the band having two ends connected together with a metal fastener.

3. A rehabilitating pipe according to claim 2; wherein the metal fastener produces a fastening force such that the pipe unit is restrained in a fastened state by the band.

4. A rehabilitating pipe according to claim 3; wherein the band is made of a metal or carbon fiber material.

5. A rehabilitating pipe according to claim 2; wherein the band is made of a metal or carbon fiber material.

6. A rehabilitating pipe according to claim 1; wherein the restraining member is positioned between the lateral plates of the segments forming the pipe unit.

7. A rehabilitating pipe according to claim 1; wherein each of the segments is made from a single piece of plastic material.

8. A rehabilitating pipe for repairing pipeline facilities, the rehabilitating pipe comprising: a plurality of segments that are mutually linked in a circumferential direction to form a pipe unit, each segment being an integrally formed plastic unit comprised of an inner-surface plate having an inner circumferential surface and lateral and end plates vertically arranged on a rim of the inner-surface plate; and a wire attached to and encircling an entire outer circumference of the pipe unit to restrain the pipe unit, the wire being inserted into the end plates of the segments and having two ends joined together to restrain the pipe unit in a fastened state.

9. A rehabilitating pipe according to claim 8; wherein the wire is made of a metal or carbon fiber material.

10. A rehabilitating pipe according to claim 9; wherein the pipe unit is linked in the pipe length direction by a linking member, the wire being joined to the linking member or being disposed in pressure contact with the linking member.

11. A rehabilitating pipe according to claim 8; wherein the pipe unit is linked in the pipe length direction by a linking member, the wire being joined to the linking member or being disposed in pressure contact with the linking member.

12. A method for repairing an existing pipe using a rehabilitating pipe, comprising the steps of:
providing a plurality of segments each having an inner-surface plate and lateral and end plates vertically arranged on a rim of the inner-surface plate;
linking, within the existing pipeline, the segments in a circumferential direction to construct a plurality of pipe units;
attaching a restraining member to each pipe unit so as to encircle an outer circumference of the pipe unit; and
sequentially linking together the pipe units to which the restraining members have been attached to construct the rehabilitating pipe within the existing pipeline.

13. A method according to claim 12; wherein the sequentially linking step comprises sequentially linking together the pipe units so as to provide a space between the existing pipe and the rehabilitating pipe; and further comprising the step of filling the space between the existing pipe and the rehabilitating pipe with a grouting material to integrate the rehabilitating pipe with the existing pipe.

14. A method according to claim 12; wherein each of the segments is made from a single piece of plastic material.

15. A method according to claim 12; wherein the attaching step comprises attaching the restraining member to each pipe unit so that the restraining member is positioned between the lateral plates of the segments forming the pipe unit.

16. A method for repairing an existing pipe using a rehabilitating pipe, comprising the steps of:
providing a plurality of segments each having an inner-surface plate and lateral and end plates vertically arranged on a rim of the inner-surface plate;
for each segment, providing a reinforcement plate at a portion along a circumferential direction of the lateral plates;
while in the existing pipe, linking the segments in a circumferential direction and linking the segments in a pipe length direction using a linking member while fastening the reinforcement plates to the respective segments via the linking member to thereby construct the rehabilitating pipe within the existing pipe, the linking step comprising linking the segments in the circumferential and pipe length directions so as to provide a space between the existing pipe and the rehabilitating pipe; and
filling the space between the existing pipe and the rehabilitating pipe with a grouting material to integrate the rehabilitating pipe with the existing pipe.

17. A method according to claim 16; wherein each of the segments is made from a single piece of plastic material.

18. A method according to claim 16; wherein the reinforcement plate of each segment is made of a metal or carbon fiber material.

19. A pipe unit for a rehabilitating pipe used to rehabilitate an existing pipe, the pipe unit comprising:
a plurality of segments mutually coupled in a circumferential direction of the pipe unit, each of the segments having an inner-surface plate and an outer-wall plate extending vertically from and around an entire perimeter of the inner-surface plate, the outer-wall plate having a pair of lateral plates extending along a longitudinal direction of the inner-surface plate and a pair of end plates connected between the respective lateral plates; and
a restraining member contacting and encircling each of the coupled segments to restrain the pipe unit the circumferential direction.

20. A pipe unit according to claim 19; wherein the restraining member comprises a wire that encircles the entire circumference of the pipe unit.

21. A pipe unit according to claim 20; wherein the wire is inserted into insertion holes of the end plates of the coupled segments.

* * * * *